United States Patent
Sekine et al.

(10) Patent No.: US 7,886,865 B2
(45) Date of Patent: Feb. 15, 2011

(54) ELECTRIC POWER STEERING APPARATUS

(75) Inventors: Takaaki Sekine, Chigasaki (JP); Atsushi Ooshima, Yokohama (JP); Tetsuya Kodama, Fujisawa (JP); Seiichi Kobayashi, Yokohama (JP); Keiji Kashimoto, Takasaki (JP); Hideaki Kawada, Maebashi (JP); Shigeo Shinohara, Maebashi (JP); Takeshi Senba, Maebashi (JP)

(73) Assignee: NSK Ltd., Tokyo (JP)

( * ) Notice: Subject to any disclaimer, the term of this patent is extended or adjusted under 35 U.S.C. 154(b) by 237 days.

(21) Appl. No.: 12/296,645

(22) PCT Filed: Apr. 11, 2007

(86) PCT No.: PCT/JP2007/058006

§ 371 (c)(1),
(2), (4) Date: Oct. 9, 2008

(87) PCT Pub. No.: WO2007/119756

PCT Pub. Date: Oct. 25, 2007

(65) Prior Publication Data

US 2009/0272599 A1    Nov. 5, 2009

(30) Foreign Application Priority Data

Apr. 11, 2006  (JP) .............................. 2006-109137
Apr. 11, 2006  (JP) .............................. 2006-109138
Apr. 11, 2006  (JP) .............................. 2006-109139

(51) Int. Cl.
B62D 5/04    (2006.01)

(52) U.S. Cl. .................................................... 180/444

(58) Field of Classification Search ................. 180/443, 180/444, 446
See application file for complete search history.

(56) References Cited

U.S. PATENT DOCUMENTS 6,211,631 B1 *   4/2001   Wilson-Jones et al. ........ 318/12

(Continued)

FOREIGN PATENT DOCUMENTS

JP          11-116776 A      4/1999

(Continued)

OTHER PUBLICATIONS

Form PCT/IB/338 (one (1) page); Form PCT/IB/373 (one (1) page) and Form PCT/ISA/237 (six (6) pages) totaling (eight (8) pages).

(Continued)

*Primary Examiner*—Kevin Hurley
(74) *Attorney, Agent, or Firm*—Crowell & Moring LLP

(57) ABSTRACT

To provide an electric power steering apparatus in which it is possible to reduce a size of the entire structure of a control unit while sufficiently showing a heat radiation effect of heat generating members. The electric power steering apparatus includes a steering column 3 having inserted therein a steering shaft 2 to which steering torque is transmitted, a reduction gear box 4 coupled to the steering shaft 2, and an electric motor 5 that transmits a steering assisting force to the steering shaft 2 via a reduction mechanism in the reduction gear box. In the reduction gear box 4, a motor mounting section 17 for mounting the electric motor 5 is formed at an end face in a direction perpendicular to an axis of the steering shaft 2 and a control-unit mounting section 20 for mounting a control unit 19 for controlling to drive the electric motor 5 is formed near the motor mounting section 17.

14 Claims, 15 Drawing Sheets

U.S. PATENT DOCUMENTS

| | | | |
|---|---|---|---|
| 7,021,418 B2 * | 4/2006 | Tominaga et al. | 180/444 |
| 7,357,216 B2 * | 4/2008 | Ishii et al. | 180/444 |
| 7,635,046 B2 * | 12/2009 | Tominaga et al. | 180/444 |
| 2003/0173920 A1 * | 9/2003 | Tominaga et al. | 318/432 |
| 2005/0167183 A1 * | 8/2005 | Tominaga et al. | 180/444 |

FOREIGN PATENT DOCUMENTS

| | | |
|---|---|---|
| JP | 2002-308122 A | 10/2002 |
| JP | 2003-182606 A | 7/2003 |
| JP | 2004-1621 A | 1/2004 |
| JP | 2004-106703 A | 4/2004 |
| JP | 2004-345643 A | 12/2004 |
| JP | 2005-329866 A | 12/2005 |
| JP | 2005-329867 A | 12/2005 |
| JP | 2006-329869 A | 12/2005 |
| JP | 2006-36077 A | 2/2006 |
| JP | 2005-329868 A | 12/2006 |

OTHER PUBLICATIONS

International Search Report dated Jul. 10, 2007 (two (2) pages).

* cited by examiner

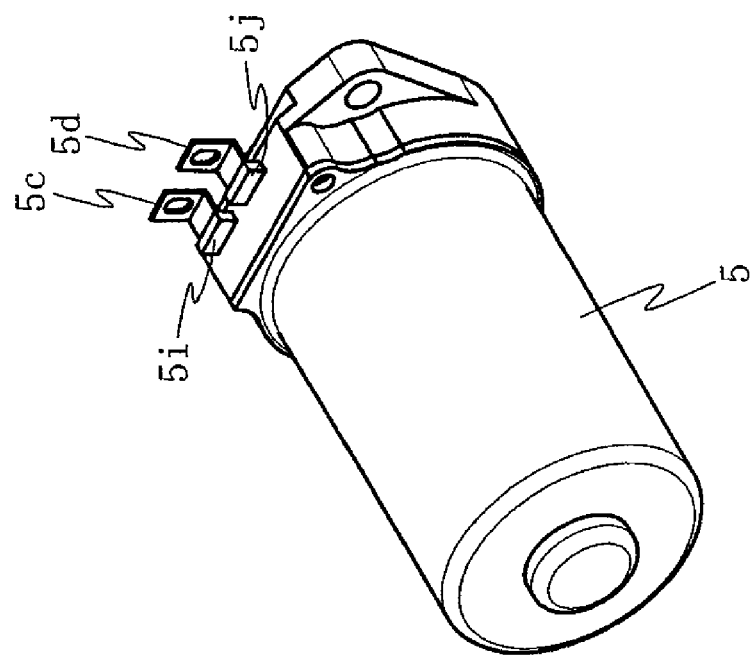
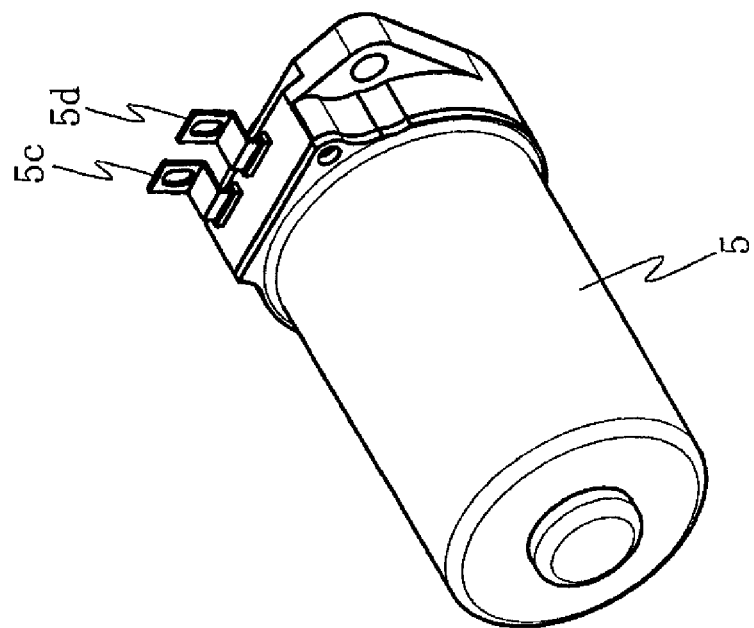
FIG. 15A
FIG. 15B

ELECTRIC POWER STEERING APPARATUS

TECHNICAL FIELD

The present invention relates to an electric power steering apparatus including a steering column having inserted therein a steering shaft to which steering torque is transmitted and an electric motor that transmits a steering assisting force to the steering shaft via a reduction mechanism in a reduction gear box.

BACKGROUND ART

As an electric power steering apparatus in the past, for example, there has been proposed an electric power steering apparatus in which a motor is housed in a part of a rack case or a steering gear box in which a rack shaft is slidably housed or mounted, a housing in which a control board for controlling to drive the motor is housed is formed in the rack case or the steering gear box, and, when the control board inserted from an opening of the housing is brought into contact with an attachment boss formed in a bottom portion opposed to the opening, a board connection terminal provided in the control board comes into contact with a motor side connection terminal protrusionly provided in the housing and electrically connected thereto (see, for example, JP2005-329866A (hereinafter referred to as Patent Document 1), JP2005-329867A (hereinafter referred to as Patent Document 2), JP2005-329868A (hereinafter referred to as Patent Document 3), and JP2005-329869A (hereinafter referred to as Patent Document 4)).

On the control board, a CPU is attached on a front surface side, a capacitor, a power relay, and the like are disposed and a supporting board serving as a heat sink is protrusionly provided on a rear surface side, and an FET (field effect transistor) is attached to this supporting board.

Connectors for power supply and input and output of signals from the outside are projected and formed near the steering gear box and on an upper surface cover of the housing in parallel to an input shaft of the steering gear box to prevent a flying stone or the like from hitting the connectors and is configured such that connector connection is performed from above.

On the other hand, as a column-type electric power steering apparatus in the past, for example, there has been proposed an electric power steering apparatus having the structure in which an input shaft and an output shaft are connected via torsion bar, a worm gear mechanism that transmits torque of an electric motor to the output shaft, a magnetic sensor that is arranged in a steering column side position of this worm gear mechanism and detects steering torque, and a switching transistor set on an outer peripheral side of this magnetic sensor are mounted in a housing, and a control board is disposed on a cover that closes a magnetic sensor side opening end of the housing (see, for example, JP2004-106703A (hereinafter referred to as Patent Document 5)).

DISCLOSURE OF THE INVENTION

However, in the prior art examples disclosed in Patent Documents 1 to 4, since the CPU, the FET, the capacitor, the power relay, and the like are arranged on one control board, heat generating members such as the FET and the capacitor and the CPU and the like that reject temperature rise are mixed. Therefore, there are unsolved problems in that the housing that houses the control board is increased in size, heat generated by the heat generating members tends to fill the housing that houses the control board, and, although the FET is attached to the supporting board serving as the heat sink, since heat mass of the supporting board itself is small, a sufficient heat radiation effect cannot be shown.

In the prior art examples disclosed in Patent Documents 1 to 4, the electric power steering apparatus has the structure in which the housing that houses the control board for controlling to drive the motor is formed between a motor case of the rack case and the steering gear box. Therefore, there are unsolved problems in that it is inevitable to arrange the connectors for power supply and input and output of signals from the outside in an upper part closer to the steering gear box, drops of water and dust tend to penetrate in connector positions and, since the connectors are arranged in the positions near the steering gear box, a direction of connector connection is uniquely determined and workability of the connector connection is low.

Moreover, in the prior art example disclosed in Patent Document 5, the worm gear mechanism, the magnetic sensor, and the control board are arranged in this order in the housing and the cover. Therefore, there are unsolved problems in that the lengths in an axial direction of the housing and the cover are increased and, since the control board is arranged in a position close to the steering column, the length of the entire electric power steering apparatus is increased in order to secure a predetermined collapse stroke in the steering column, and, to reduce a size of the electric power steering apparatus, the predetermined collapse stroke cannot be secured.

Therefore, the present invention has been devised in view of the unsolved problems of the prior art examples and it is a first object of the present invention to provide an electric power steering apparatus in which it is possible to reduce a size of the entire structure of a control unit while sufficiently showing a heat radiation effect of heat generating members.

It is a second object of the present invention to provide a column-type electric power steering apparatus in which connector connection is easy, penetration of drops of water and dust can be prevented, a degree of freedom of a connecting direction of the connector connection is high, and connectors are prevented from being affected by generated heat of a motor.

Moreover, it is a third object of the present invention to provide a small electric power steering apparatus while securing a predetermined collapse stroke.

In order to attain the first object, an electric power steering apparatus according to claim 1 is an electric power steering apparatus including a steering column having inserted therein a steering shaft to which steering torque is transmitted, a reduction gear box coupled to the steering column, and an electric motor that transmits a steering assisting force to the steering shaft via a reduction mechanism in the reduction gear box. The electric power steering apparatus is characterized in that, in the reduction gear box, the electric motor is mounted on a motor mounting section formed at an end face in a direction crossing the steering shaft and a control unit for controlling to drive the electric motor is mounted on a control-unit mounting section formed on an outer surface close to the motor mounting section.

In this invention according to claim 1, the electric motor is mounted on the motor mounting section formed in the reduction gear box and the control unit is mounted on the control-unit mounting section formed on the outer surface close to the motor mounting section. Therefore, it is possible to radiate generated heat generated by the control unit to the reduction gear box having large heat mass.

In order to attain the first object, an electric power steering apparatus according to claim 2 is characterized in that, in the invention according to claim 1, the control unit includes at least a control board mounted with a command-value calculating unit that calculates a driving command value of the electric motor and a power module board mounted with a power module involving heat generation that controls to drive the electric motor on the basis of the driving command value from the command-value calculating unit, and the power module board is directly mounted on the control-unit mounting section of the reduction gear box.

In this invention according to claim 2, the power module board mounted with the power module involving heat generation is directly mounted on the control-unit mounting section of the reduction gear box. Therefore, it is possible to further improve the heat radiation effect.

Moreover, in order to attain the first object, an electric power steering apparatus according to claim 3 is characterized in that, in the invention according to claim 1, the control unit includes at least a control board mounted with a command-value calculating unit that calculates a driving command value of the electric motor and a power module board mounted with a power module involving heat generation that controls to drive the electric motor on the basis of the driving command value from the command-value calculating unit, and the power module board is mounted on the control-unit mounting section of the reduction gear box via a high heat conduction plate section.

In this invention according to claim 3, the power module board mounted with the power module involving heat generation is mounted on the control-unit mounting section of the reduction gear box via the high heat conduction plate section. Therefore, it is possible to radiate heat to the reduction gear box having large heat mass via the high heat conduction plate section.

Furthermore, in order to attain the first object, an electric power steering apparatus according to claim 4 is characterized in that, in the invention according to any one of claims 1 to 3, the reduction gear box is made of a high heat conductive material.

In this invention according to claim 4, the reduction gear box is made of the high heat conductive material. Therefore, it is possible to increase a heat capacity and improve the heat radiation effect.

Furthermore, in order to attain the first object, an electric power steering apparatus according to claim 5 is characterized in that, in the invention according to claim 4, the reduction gear box is formed by die-casting any one of aluminum, an aluminum alloy, magnesium, and a magnesium alloy.

In this invention according to claim 5, it is possible to easily manufacture the reduction gear box while keeping high heat conductivity.

In order to attain the first object, an electric power steering apparatus according to claim 6 is characterized in that, in the invention according to any one of claims 1 to 5, the control unit includes a synthetic resin frame that surrounds the power module board directly mounted on the reduction gear box and holds the control board while keeping a predetermined space with respect to the power module board and a cover that covers the synthetic resin frame, and the cover is attached to the control-unit mounting section of the reduction gear box.

In this invention according to claim 6, the cover is attached to the control-unit mounting section of the reduction gear box. Therefore, it is possible to show an electromagnetic shield effect by forming the cover with a conductive material.

Moreover, in order to attain the first object, an electric power steering apparatus according to claim 7 is characterized in that, in the invention according to any one of claims 2 to 6, in the control board, large components such as a relay and a capacitor are arranged on an upper side to effectively use an upper side free space of the control-unit mounting section in the reduction gear box.

In this invention according to claim 7, the large components are arranged in the upper side free space of the control-unit mounting section. Therefore, it is possible to form the free space as small as possible and reduce a size of the control unit itself.

Furthermore, in order to attain the first object, an electric power steering apparatus according to claim 8 is characterized in that, in the invention according to any one of claims 1 to 7, the reduction gear box includes at least a worm housing unit that houses a worm coupled to an output shaft of the electric motor, a worm-wheel housing unit that houses a worm wheel coupled to the steering shaft, and a torque-sensor housing unit that is coupled to the worm-wheel housing unit to house the torque sensor and coupled to the steering column, and the control-unit mounting section for mounting the control unit is formed in an outer peripheral portion of the worm housing unit, the worm-wheel housing unit, and the torque-sensor housing unit.

In this invention according to claim 8, the control-unit mounting section is formed in the outer peripheral portion of the worm housing unit, the worm-wheel housing unit, and the torque-sensor housing unit. Therefore, it is possible to set the control unit close to the electric motor and the torque sensor and easily perform electric connection of the control unit to the electric motor and the torque sensor.

In order to attain the second object, an electric power steering apparatus according to claim 9 is characterized in that, in the invention according to any one of claims 1 to 8, the electric motor is disposed on one of a vehicle inner side and a vehicle outer side of the control unit and a connection connector for connection to an external connection connector is disposed on the other of the vehicle inner side and the vehicle outer side of the control unit.

In this invention according to claim 9, the connection connector is disposed in the vehicle inner side or the vehicle outer side of the control unit. Therefore, it is possible to increase a degree of freedom of a connecting direction of the external connection connector, connector connection is easy, and the connector side is not affected by heat generation of the electric motor.

Moreover, in order to attain the second object, an electric power steering apparatus according to claim 10 is characterized in that, in the invention according to claim 9, a direction of connection of the connection connector to the external connection connector is set in a vehicle width direction.

In this invention according to claim 10, the direction of connection of the connection connector to the external connection connector is set in the vehicle width direction. Therefore, it is possible to prevent penetration of drops of water and dust.

Furthermore, in order to attain the second object, an electric power steering apparatus according to claim 11 is characterized in that, in the invention according to claim 9 or 10, the connection connector includes a power supply connector and a signal connector adjacent to each other.

In this invention according to claim 11, the connection connector includes the power supply connector and the signal connector. Therefore, it is possible to connect both a power supply system and a signal system to the control unit from an identical direction.

Furthermore, in order to attain the second object, an electric power steering apparatus according to claim 12 is characterized in that, in the invention according to any one of claims 9 to 11, the electric motor is disposed on the vehicle inner side of the control unit and the connection connector is disposed on the vehicle outer side of the control unit.

In this invention according to claim 12, the connection connector is on the vehicle outer side of the control unit. Therefore, it is possible to set a connection distance to an earth point short.

In order to attain the second object, an electric power steering apparatus according to claim 13 is characterized in that, in the invention according to any one of claims 9 to 12, the electric motor and the control unit are electrically connected directly by a connection terminal and a terminal block.

In this invention according to claim 13, the electric motor and the control unit are electrically connected directly by the connection terminal and the connection block. Therefore, the electric connection between the electric motor and the control unit can be performed at a shortest distance without the intervention of a motor harness.

Moreover, in order to attain the third object, an electric power steering apparatus according to claim 14 is characterized in that, in the invention according to any one of claims 1 to 13, the control unit is disposed in a position where the control unit does not interfere with a moving member at the time of a collapse stroke of the steering column of the reduction gear box.

In this invention according to claim 14, the control unit is disposed in the position where the control unit does not interfere with the moving member at the time of a collapse stroke of the reduction gear box. Therefore, it is possible to secure a predetermined collapse stroke of the steering column and obtain a stable energy absorption amount as specified by a set value at the time of collapse.

Furthermore, in order to attain the third object, an electric power steering apparatus is characterized in that, in the invention according to claim 14, the reduction gear box includes at least a worm housing unit that houses a worm coupled to an output axis of the electric motor, a worm-wheel housing unit that houses a worm wheel coupled to the steering shaft, and a torque-sensor housing unit that is coupled to the worm-wheel housing unit to store the torque sensor and coupled to the steering column, and the control-unit mounting section for mounting the control unit is formed in an outer peripheral portion of the worm housing unit, the worm-wheel housing unit, and the torque-sensor housing unit, a distal end of the torque-sensor housing unit is formed as a contraction stopper for the steering column at the time of collapse, and a contraction stopper side end surface position of the control unit mounted on the control-unit mounting section is set further on a worm-wheel housing unit side than the contraction stopper.

In this invention, the distal end of the torque-sensor housing unit is formed as the contraction stopper for the steering column at the time of collapse and the contraction stopper side end face position of the control unit mounted on the control-unit mounting section is set further on the worm-wheel housing unit side than the contraction stopper. Therefore, it is possible to surely prevent interference between a moving member such as the steering column and the control unit at the time of collapse.

According to the present invention, the control unit is mounted on the reduction gear box, the power module serving as a heat generating unit configuring the control unit is mounted on the power module board, and the other control elements are mounted on the control board. Consequently, it is possible to prevent generated heat on the power module board from being directly transmitted to the control board. Moreover, the power module board is directly attached to the control-unit mounting section of the reduction gear box. Therefore, there is an effect that the reduction gear box serves as heat mass and the radiation effect of heat generated in the power module board can be improved.

The control unit includes the synthetic resin frame that surrounds the power module board directly mounted on the reduction gear box and holds the control board while keeping the predetermined space with respect to the power module board and the cover that covers the synthetic resin frame. The cover is attached to the control-unit mounting section of the reduction gear box. Consequently, there is an effect that the cover can be used as an electromagnetic shield and electromagnetic noise due to high-frequency switching of a switching element configuring the motor driving circuit mounted on the power module board can be prevented from leaking to the outside.

Moreover, the large components such as the relay and the capacitor are arranged on the upper side of the control board to effectively use the upper side free space of the control-unit mounting section in the reduction gear box. Consequently, there is an effect that the control unit can be reduced in size and generated heat of the capacitor and the like can be prevented from affecting a control element on a lower side.

Furthermore, according to the present invention, the control unit is provided in the reduction gear box, the electric motor is attached to one of the vehicle inner side and the vehicle outer side of this control unit, and the external connection connector is provided on the other of the vehicle inner side and the vehicle outer side of the control unit. Therefore, there is an effect that penetration of drops of water and dust can be prevented, a degree of freedom of a connecting direction of the external connection connector can be increased, connector connection is easy, and the connector side is not affected by heat generation of the electric motor.

Furthermore, in a normal vehicle, earth points are provided in left and right positions of an engine room closer to a cabin. Therefore, it is possible to set a distance of connection to the earth point short by providing the power supply connector on the vehicle outer side.

According to the present invention, the control unit is disposed in the position where the control unit does not interfere with the moving member at the time of a collapse stroke of the steering column of the reduction gear box. Therefore, it is possible to secure a predetermined collapse stroke of the steering column and obtain a stable energy absorption amount as specified by a set value at the time of collapse.

Moreover, there is an effect that the length in an axial direction of the entire reduction box can be reduced to realize a reduction in size thereof by arranging the control unit in the upper part of the torque-sensor housing section in the reduction gear box.

BRIEF DESCRIPTION OF THE DRAWINGS

FIGS. 15A and 15B are the perspective views showing the modifications of the bus bars of the electric motor.

BEST MODE FOR CARRYING OUT THE INVENTION

An embodiment of the present invention will be hereinafter explained on the basis of the drawings.

Figure 1:
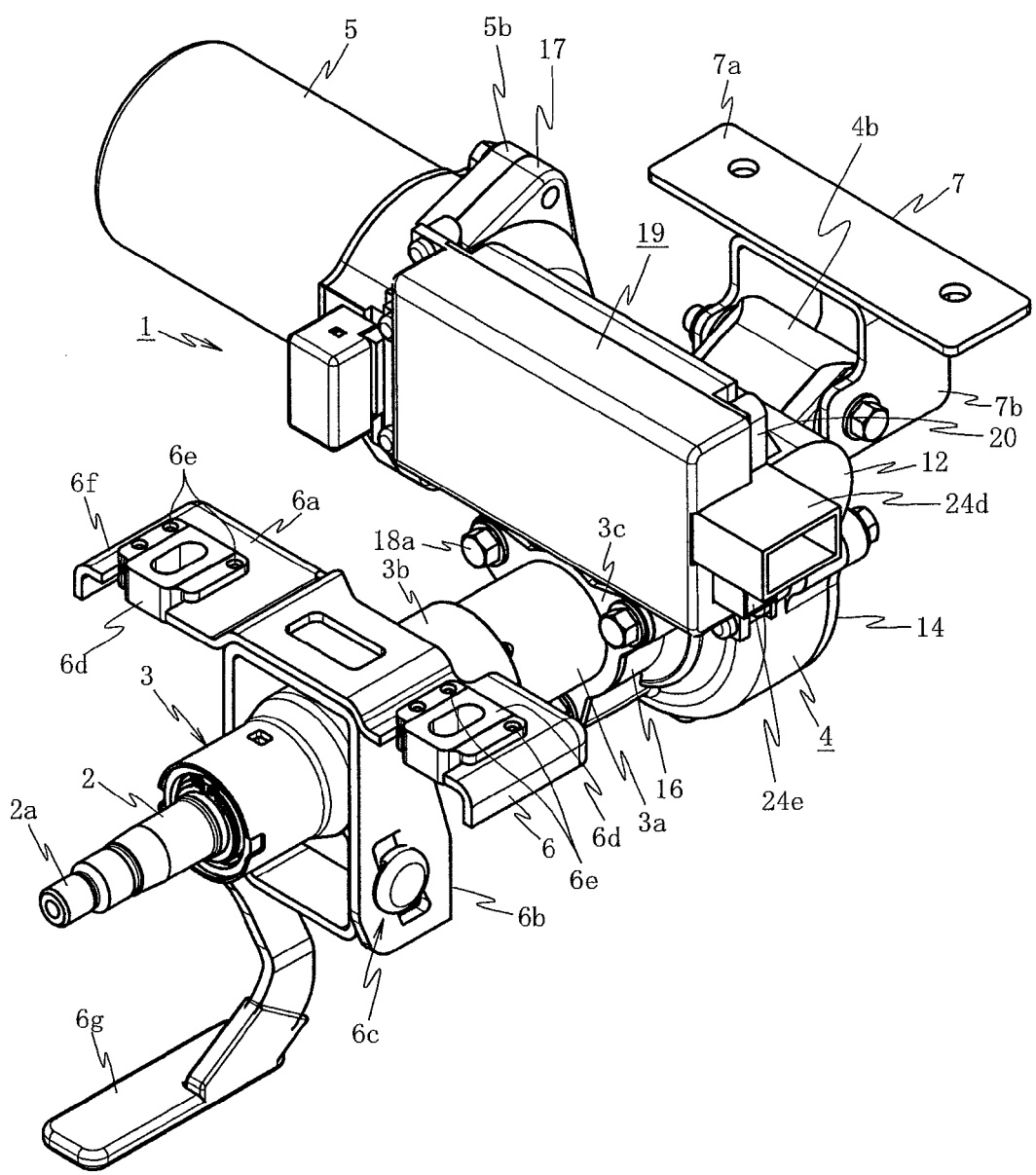
FIG. 1 is a perspective view showing an embodiment of an electric power steering apparatus according to the present invention.
Figure 2:
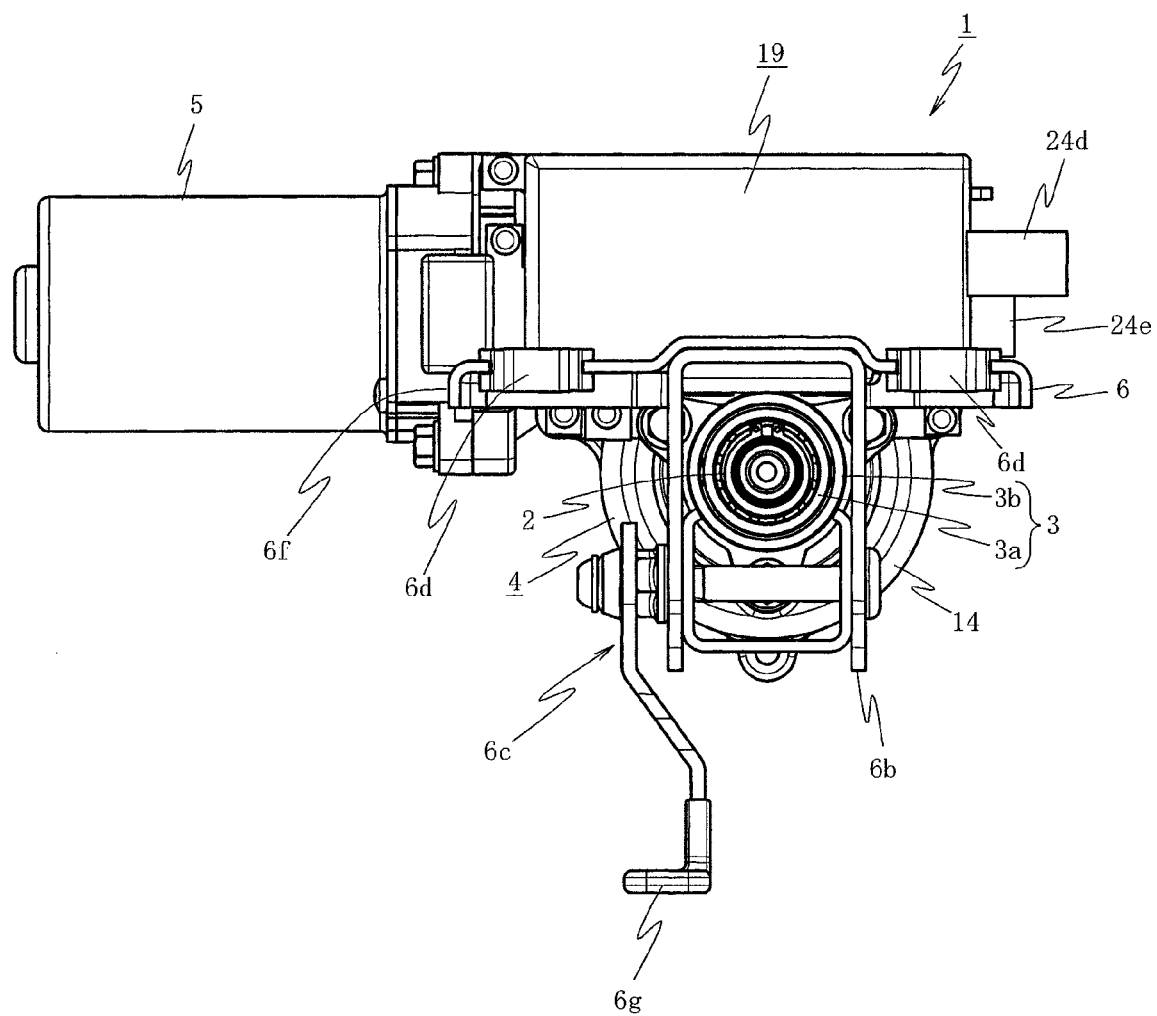
FIG. 2 is a front view of the electric power steering apparatus according to the present invention.
Figure 3:
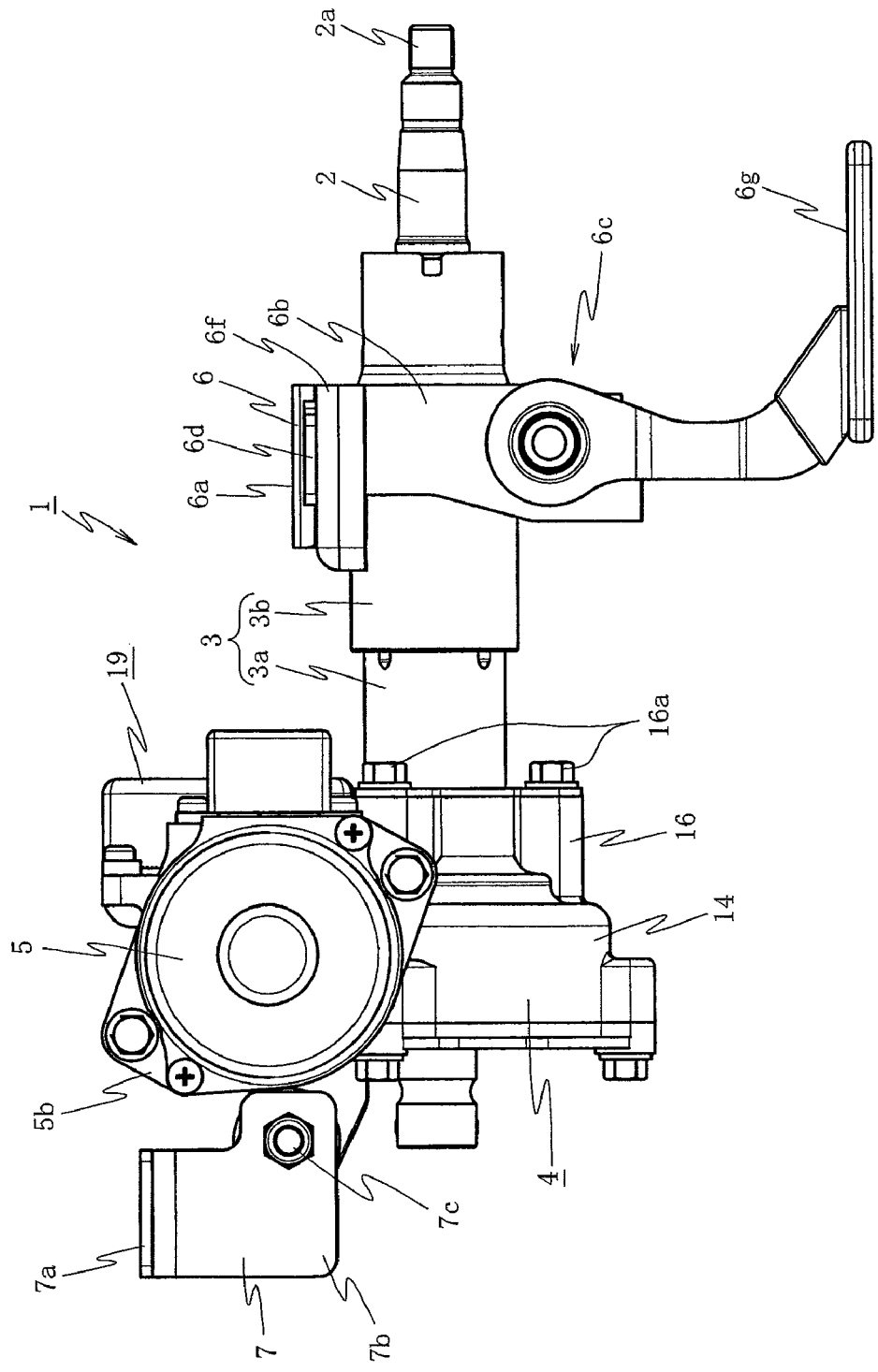
FIG. 3 is a left side view of FIG. 2.
Figure 4:
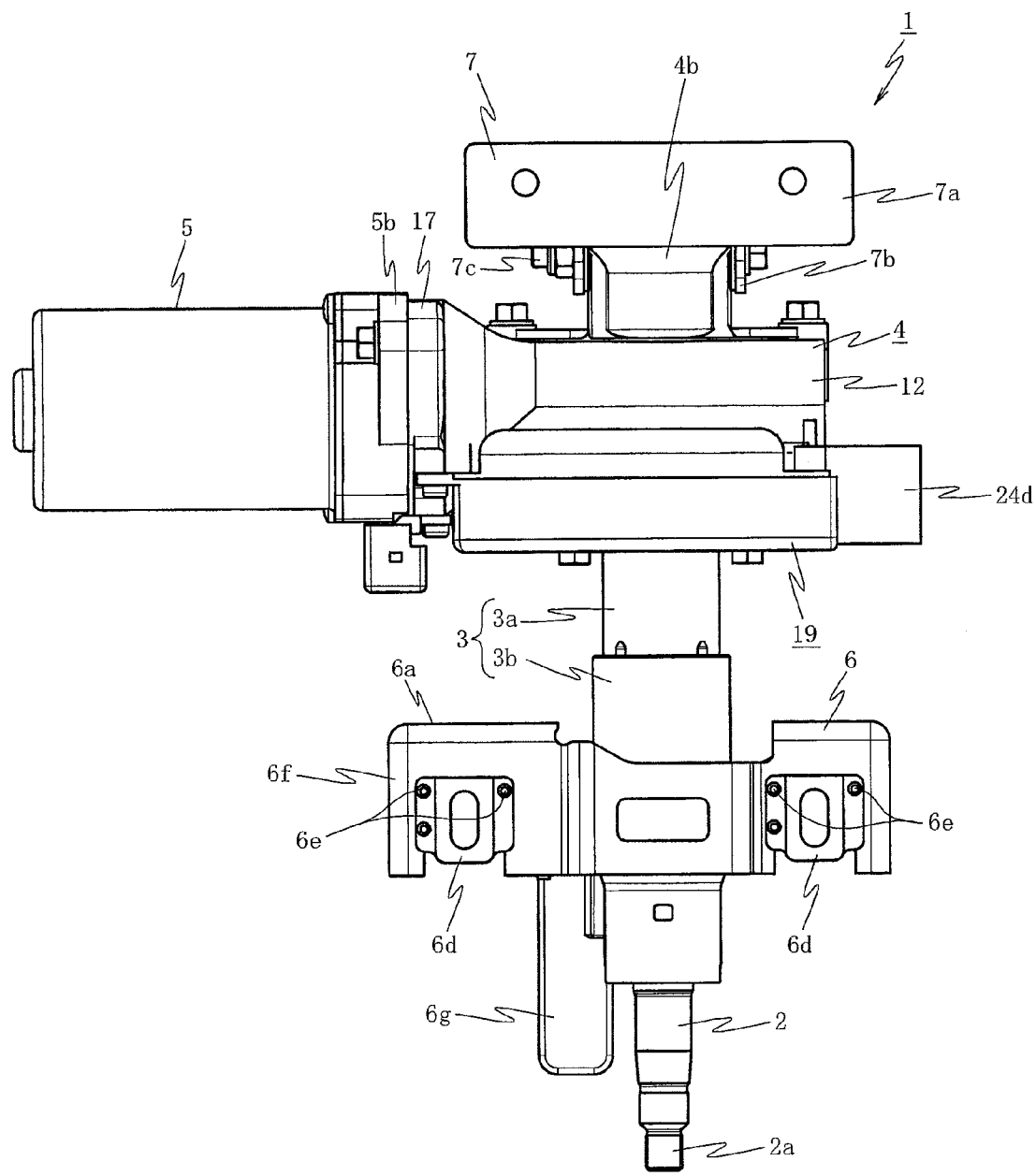
FIG. 4 is a plan view of FIG. 2.
Figure 5:
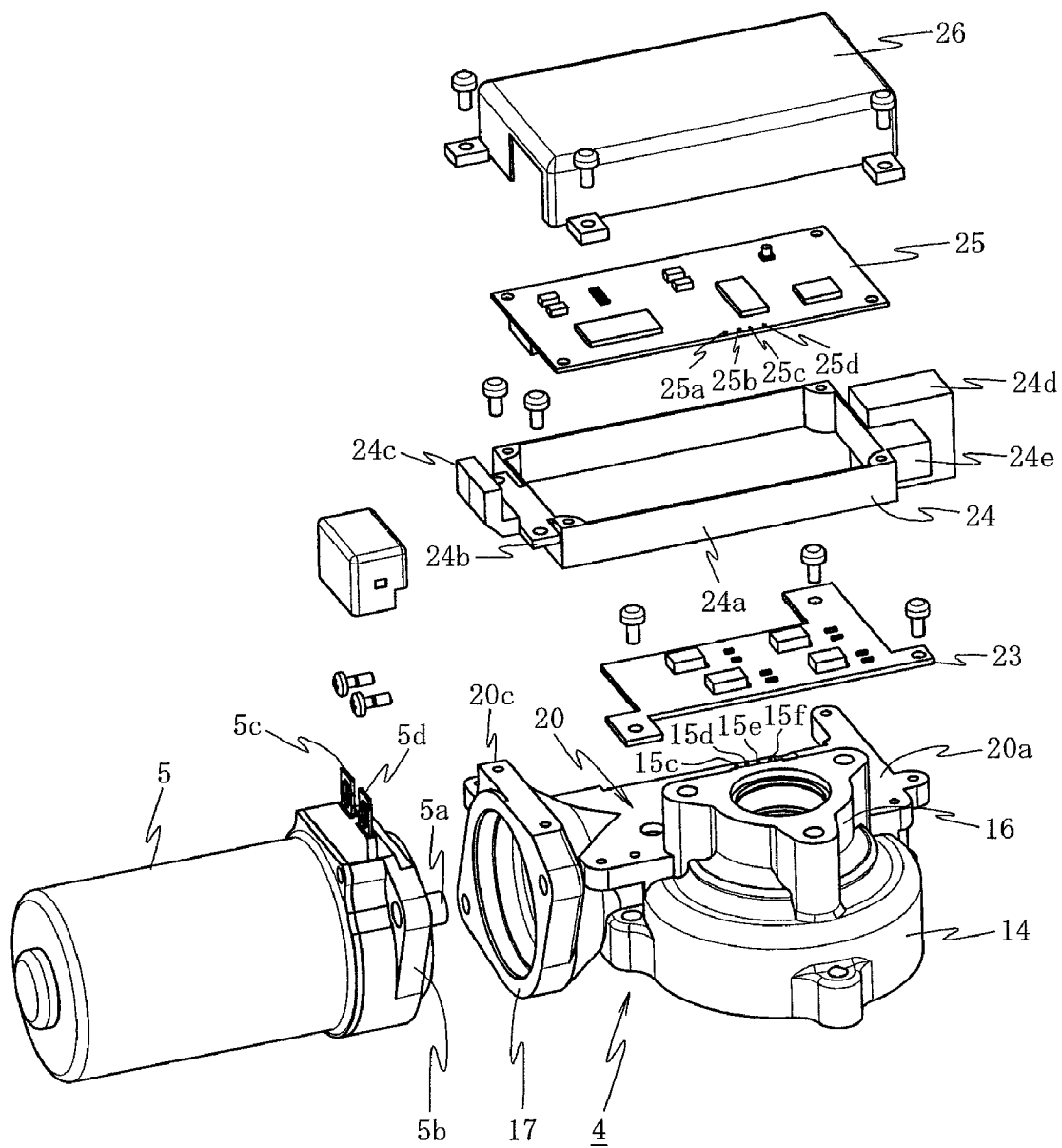
FIG. 5 is a disassembled perspective view of a main part of the present invention.
Figure 6:
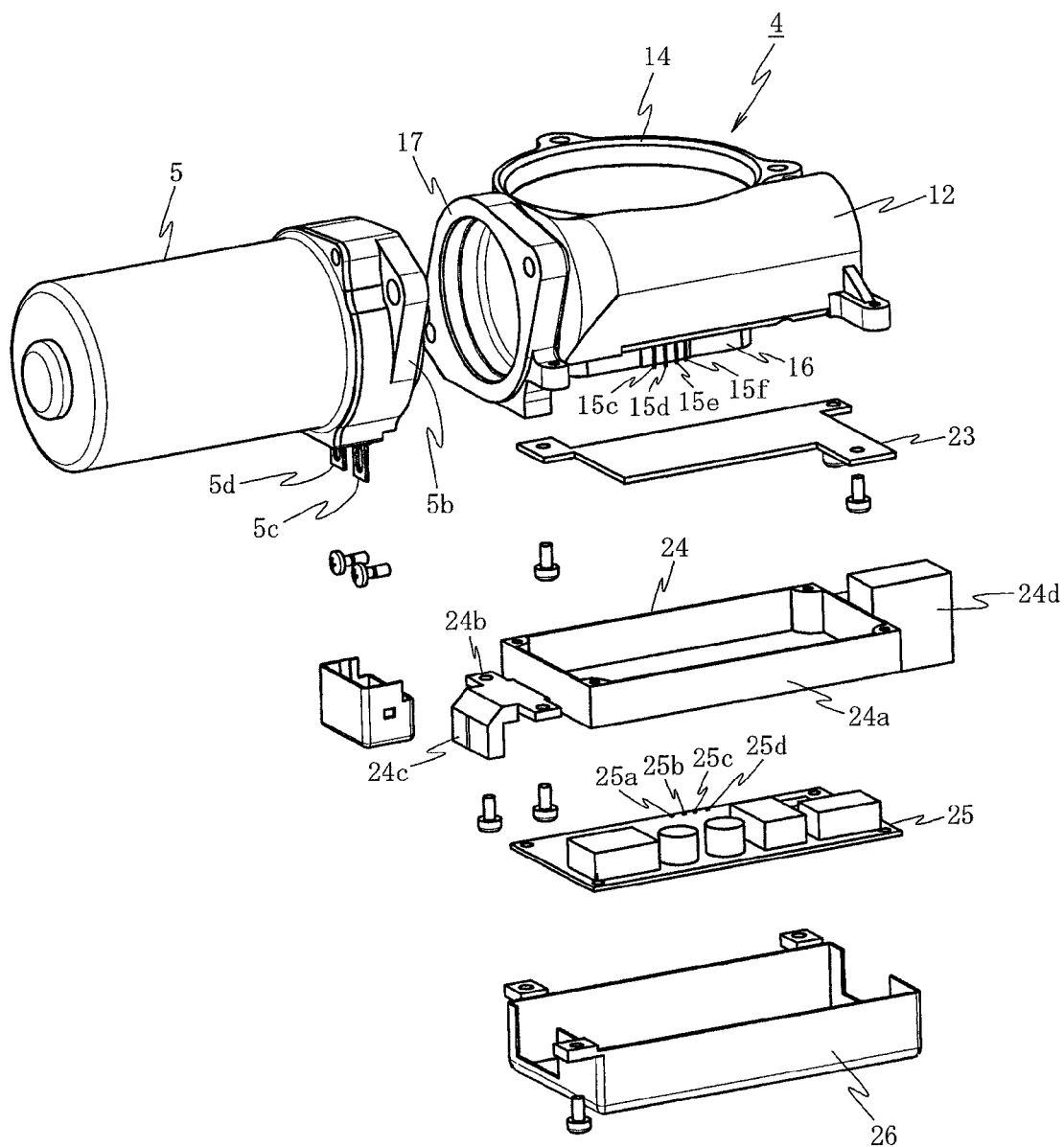
FIG. 6 is a disassembled perspective view of the main part of the present invention viewed from a direction opposite to that in FIG. 5.

FIG. 1 is a perspective view showing an example of a case in which an embodiment of the present invention is applied to a right-hand drive car. FIG. 2 is a front view, FIG. 3 is a left side view, FIG. 4 is a plan view, and FIGS. 5 and 6 are disassembled perspective views of a main part of the example.

In FIG. 1, reference numeral 1 denotes a column-type electric power steering apparatus. A reduction gear box 4 is coupled to a steering column 3 in which a steering shaft 2 having a steering-wheel mounting section 2a mounted with a steering wheel (not shown) is inserted rotatably. In this reduction gear box 4, an electric motor 5 consists of a brush motor, an axial direction of which is extended in a direction orthogonal to an axial direction of the steering column 3, is disposed.

Figure 7:
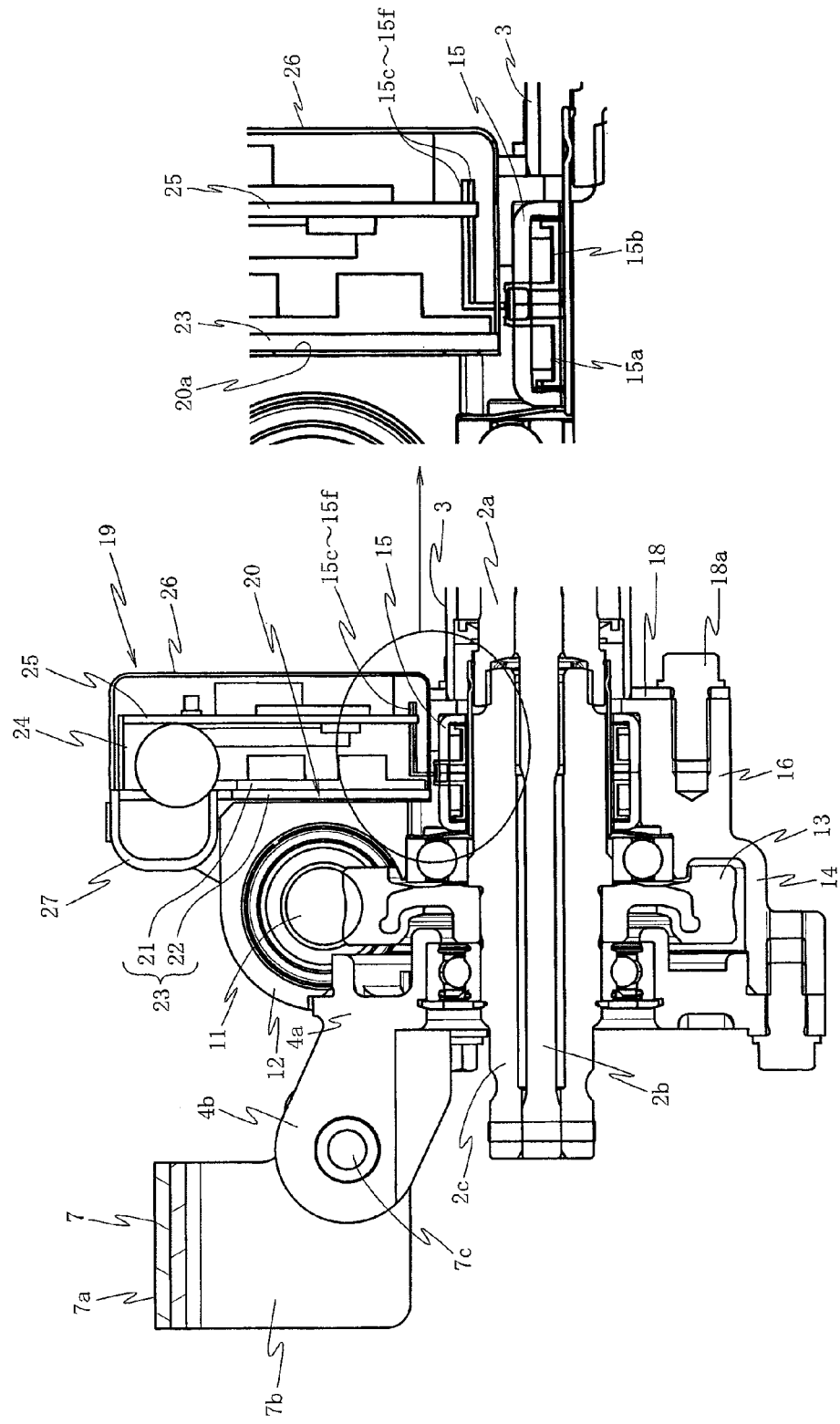
FIG. 7 is a longitudinal sectional view showing a main part in a reduction gear box position in enlargement.

The steering column 3 has, in a coupling section with the reduction gear box 4, a double tube structure including an inner tube 3a and an outer tube 3b for absorbing impact energy at the time of collapse and securing a predetermined collapse stroke. The outer tube 3b of the steering column 3 and the reduction gear box 4 are attached to a vehicle body side by an upper attachment bracket 6 and a lower attachment bracket 7. The lower attachment bracket 7 is formed by an attachment plate section 7a attached to a vehicle body side member (not shown) and a pair of supporting plate sections 7b that extend in parallel while keeping a predetermined space with respect to a lower surface of this attachment plate section 7a. As shown in FIG. 7, a distal end of the supporting plate section 7b is pivotally coupled to, via a pivot 7c, a supporting section 4b integrally formed in a cover 4a disposed on a lower end side of the reduction gear box 4, i.e., a vehicle front side.

The upper attachment bracket 6 includes an attachment plate section 6a attached to the vehicle body side member (not shown), a square frame-shaped supporting section 6b formed integrally with this attachment plate section 6a, and a tilt mechanism 6c, which supports the outer tube 3b of the steering column 3, formed in this square frame-shaped supporting section 6b. The attachment plate section 6a includes a pair of left and right capsules 6d attached to the vehicle body side member (not shown) and a sliding plate section 6f fixed to these capsules 6d by a resin injection 6e. When an impact force for moving the steering column 3 to the vehicle front is applied thereto at the time of collision, the sliding plate section 6f slides to the vehicle front with respect to the capsule 6d, the resin injection 6e is sheared, and a load of the shearing acts as a collapse start load. It is possible to adjust a tilt position of the steering column 3 up and down around the pivot 7c of the lower attachment bracket 7 by releasing a supporting state by pivoting a tilt lever 6g of the tilt mechanism 6c.

As shown in FIG. 7, the steering shaft 2 includes an input shaft 2a, an upper end of which is coupled to a steering wheel (not shown), and an output shaft 2c that is coupled to a lower end of this input shaft 2a via a torsion bar 2b and covers the torsion bar 2b.

Moreover, as shown in FIGS. 5 to 7, the reduction gear box 4 is formed by, for example, die-casting a material having high heat conductivity, for example, any one of aluminum, an aluminum alloy, magnesium, and a magnesium alloy. This reduction gear box 4 includes a worm housing unit 12 that houses a worm 11 coupled to the output shaft 5a of the electric motor 5, a worm-wheel housing section 14 that is provided on a lower side of this worm housing unit 12, has a center axis orthogonal to a center axis of the worm housing unit 12, and houses a worm wheel 13 that meshes with the worm 11, a torque-sensor housing unit 16 that is integrally and coaxially coupled to a rear side of this worm-wheel housing unit 14 and houses a torque sensor 15, a motor mounting section 17 that is formed in an open end face of the worm housing unit 12 and to which the electric motor 5 is attached, a column attaching section 18 that is formed in an rear end face of the torque-sensor housing unit 16 and to which an attachment flange 3c formed at a front end of the steering column 3 is attached, and a control-unit mounting section 20 that is formed in a plane orthogonal to a center axis of the worm-wheel housing unit 14 and the torque-sensor housing unit 16 across a part of the worm housing unit 12 and the worm-wheel housing unit 14 and to which a control unit 19 is mounted. The reduction gear box 4 is fixed to the steering column 3 by a bolt 18a in a state in which the attachment flange 3c of the steering column 3 is brought into contact with the column attaching section 18.

As shown in FIG. 7, the torque sensor 15 is configured to magnetically detect a twist state of the input shaft 2a and the output shaft 2c of the steering shaft 2 and detects steering torque transmitted to the steering shaft with a pair of detection coils 15a and 15b. External connection terminals 15c, 15d, 15e, and 15f, which project to the outside in parallel to a direction orthogonal to a center axis of the steering column 3, are connected to starts and ends of winding of these pair of detection coils 15a and 15b, respectively. Projecting portions of these external connection terminals 15c to 15f are bent, in the center thereof, in parallel to the center axis of the steering column 3 and formed in an L shape.

Figure 8:
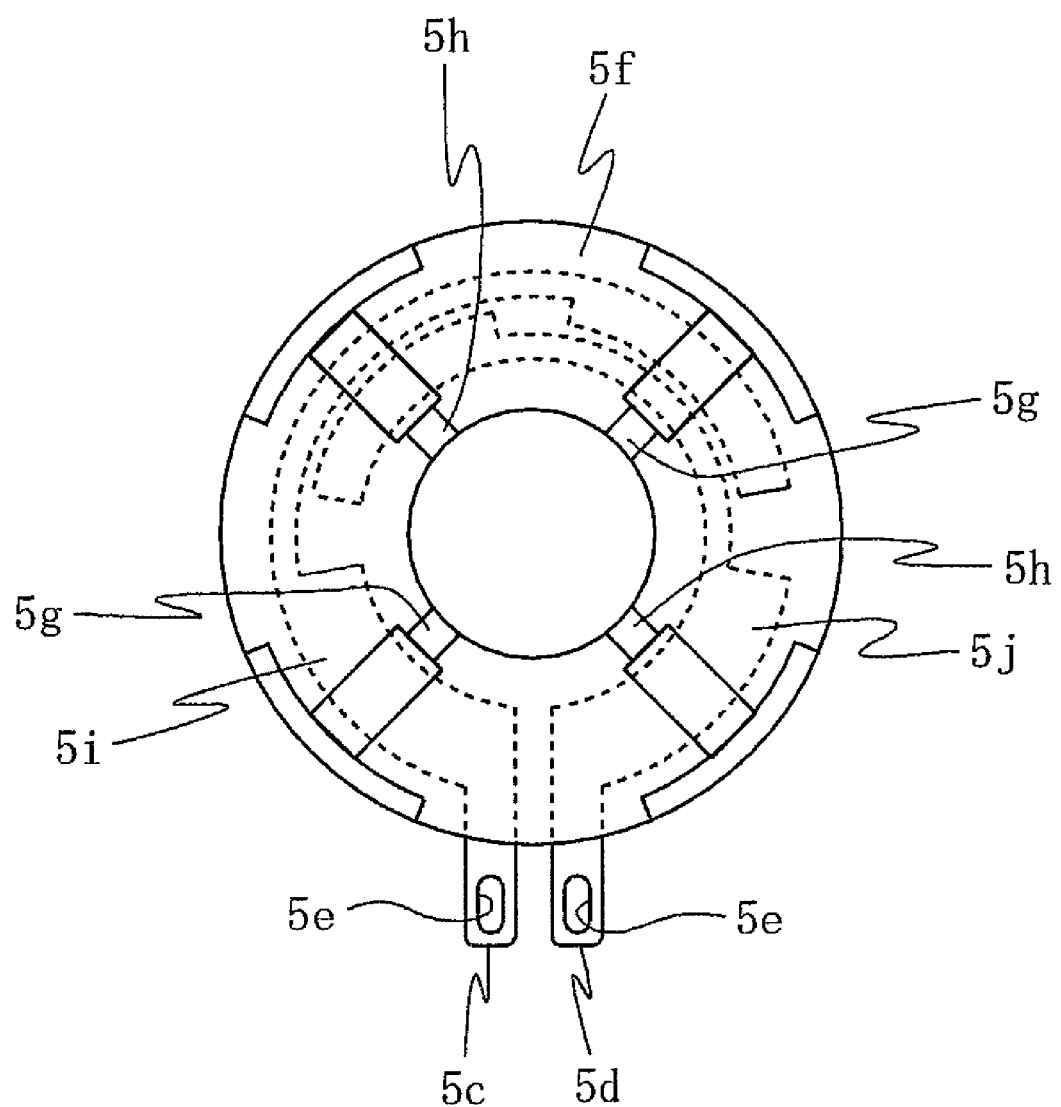
FIG. 8 is a front view showing the structure of bus bars of an electric motor.

In the electric motor 5, in a position close to and opposed to the control unit 19 mounted on the control-unit mounting section 20 in a position closer to an attachment flange section 5b of the electric motor 5, bus bars 5c and 5d serving as connection terminals connected to a built-in brush are protrusionly formed toward the rear of the vehicle body perpendicular to an axis direction of the electric motor 5 and to be substantially parallel to the center axis of the steering column 3. Long holes 5e through which fixing screws are inserted are drilled at distal end portions of these bus bars 5c and 5d. As shown in FIG. 8, the respective bus bars 5c and 5d are disposed to be insulated from each other in a brush supporting member 5f made of synthetic resin having an armature insertion hole in the center of a bottom portion thereof. The bus bars 5c and 5d include arcuate conductor sections 5i and 5j separately connected to two pairs of brushes 5g and 5h and terminal sections 5m and 5n that extend in parallel to the outside from one ends opposed to each other of these arcuate conductor sections 5i and 5j. The electric motor 5 is attached with the attachment flange section 5b thereof coupled to the motor mounting section 17 of the reduction gear box 4, the worm 11 coupled to the output shaft 5a thereof, and the bus bars 5c and 5d extended to the rear of the vehicle body.

Figure 9:
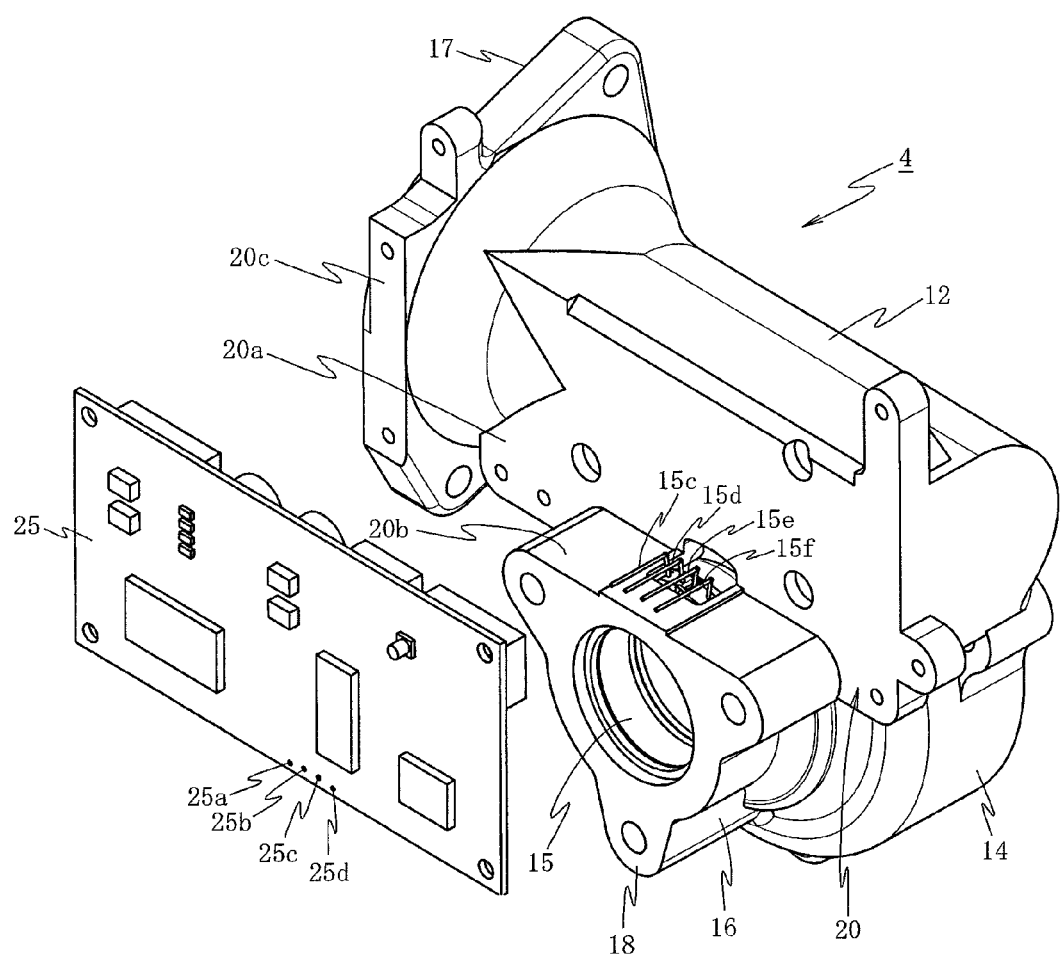
FIG. 9 is a perspective view showing a relation between the reduction gear box and a control board.

Moreover, as it is evident with reference to FIG. 9, in the control-unit mounting section 20 formed in the reduction gear box 4, a flat attaching surface 20a is formed by the worm housing unit 12 and an upper side of the worm-wheel housing unit 14 on a lower side of the worm housing unit 12. The control-unit mounting section 20 is formed in an L shape viewed from a left side surface by the flat attaching surface 20a and a flat surface 20b formed on an upper surface of the torque-sensor housing unit 16 and orthogonal to the flat attaching surface 20a. A narrow frame attaching surface 20c is also formed on a rear end surface of the motor mounting section 17 in parallel to the flat attaching surface 20a and in a position further on a rear side than the flat attaching surface 20a. The external connection terminals 15c to 15f of the torque sensor 15 are projected from the center in the left to right direction of the flat surface 20b in the torque-sensor housing unit 16.

Figure 10:
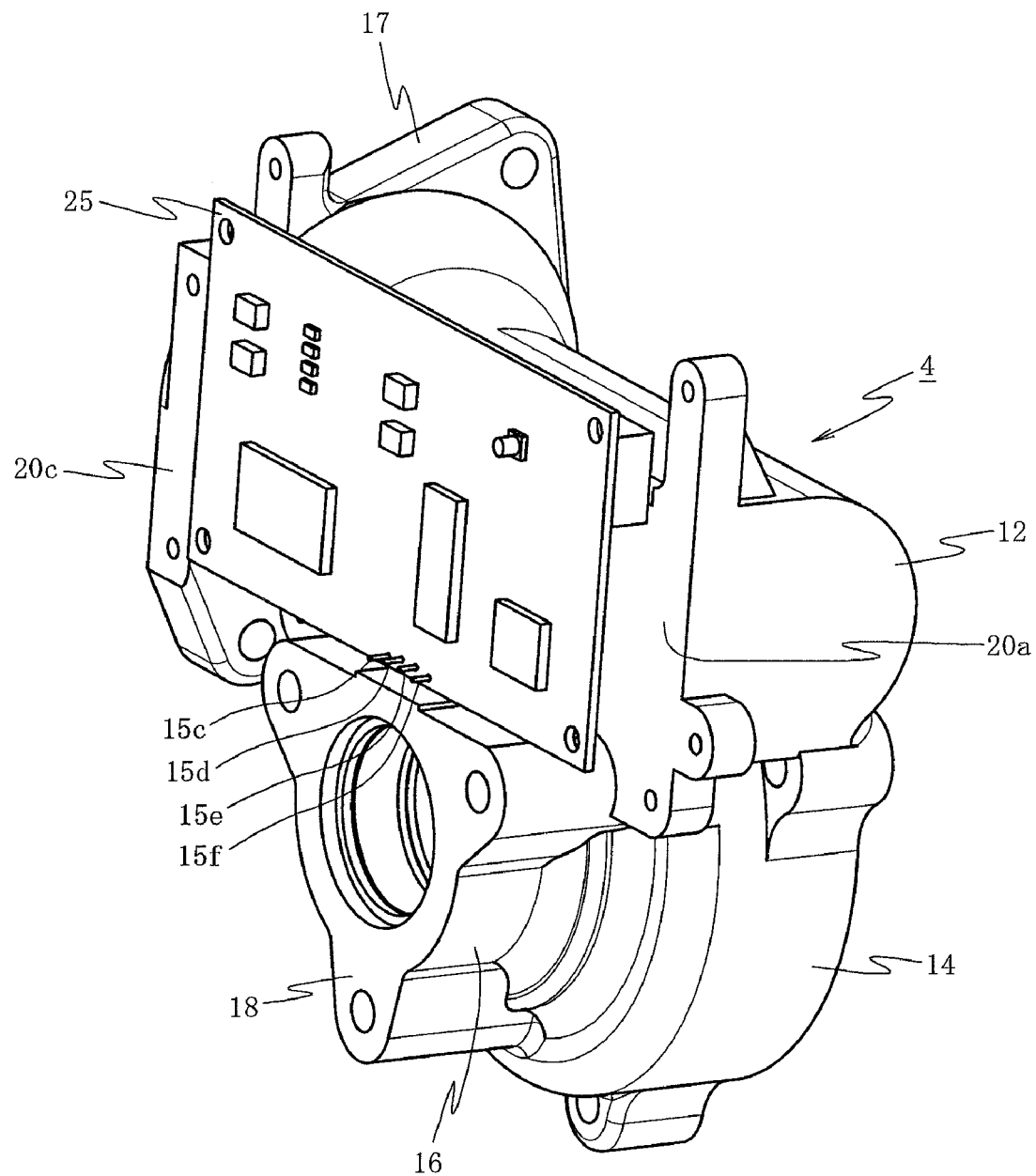
FIG. 10 is a perspective view showing a state in which external connection terminals of a torque sensor in the reduction gear box are inserted through the control board.
Figure 11A:
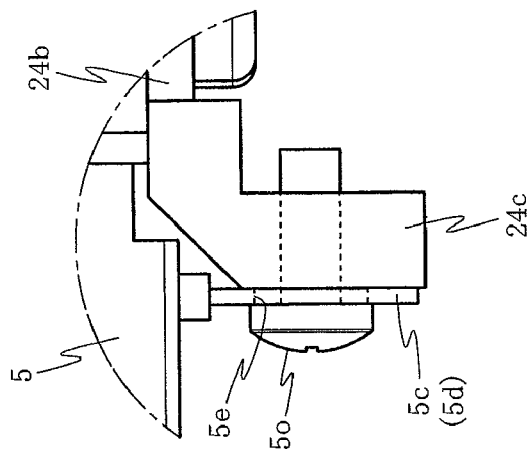
FIG. 11A is a perspective views showing.
Figure 11B:
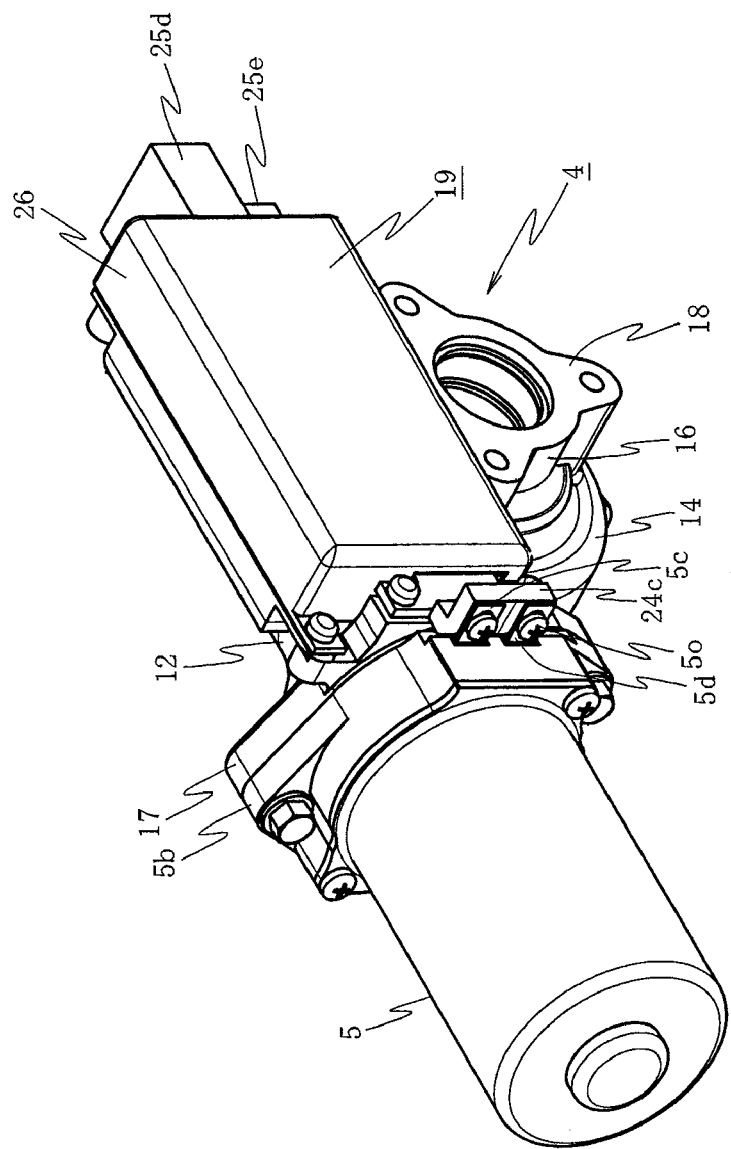
FIG. 11B is an enlarged side view of FIG. 11A showing, a main part in which a connection relation between the electric motor and a control unit is shown.

As shown in FIGS. 5, 6, and 10, the control unit 19 mounted on this control-unit mounting section 20 includes a power module board 23 made of metal having high thermal conductivity that is mounted with an H bridge circuit including a power switching element such as a field effect transistor, which controls to drive the electric motor 5, and a power module such as a pulse width modulation circuit, which drives the power switching element of this H bridge circuit, and is directly fixed to the flat attaching surface 20a via heat radiation grease, a synthetic resin frame 24 of a rectangle frame shape that surrounds this power module board 23, a control board 25 in which through holes 25a to 25d, through which the external connection terminals 15c to 15f of the torque sensor 15 attached to a front surface of this synthetic resin frame 24 are directly inserted, are drilled and that is mounted with a micro control unit (MCU) that calculates a steering assisting current command value on the basis of a torque detection value from the torque sensor 15 and a vehicle speed detection value from a not-shown speed sensor and performs current feedback control on the basis of this steering assisting current command value and a detection value of a motor current outputted to the electric motor 5 to calculate a voltage command value to the pulse width modulation circuit of the power module circuit 23 to thereby control a steering assisting force generated by the electric motor 5 and peripheral devices of the MCU, and a protective cover 26 that covers the power module board 23, the synthetic resin frame 24, and the control board 25 from a rear side thereof and is directly screwed to the control-unit mounting section 20 and formed of a conductive material.

The synthetic resin frame 24 has integrally formed therein a frame main body 24a of a rectangular frame shape, an attachment plate section 24b that is protrusionly formed in a position opposed to the bus bars 5c and 5d of the electric motor 5 at a left end of this frame main body 24a and is fixed to the frame attaching surface 20c of the reduction gear box 4, a terminal block 24c that is projected in an L shape from this attachment plate section 24b and has a connection terminal section that electrically connects the bus bars 5c and 5d of the electric motor 5 and is electrically connected to the power module board 23, a power supply connector 24d that is disposed in a center position at a right end of the frame main body 24a and connected to a battery (not shown), and a signal connector 24e that performs exchange of data with control devices of respective units of the vehicle body and is connected to a network such as a CAN. In the respective power supply connector 24d and signal connector 24e, connection connector insertion openings are formed on right end sides such that external connection connectors connected to these connectors are inserted from a right side of the vehicle body.

As shown in FIGS. 5 and 6, in the control board 25, large components such as a capacitor 25e, a power relay 25f, and the like are arranged to be aligned in the left to right direction on an upper side on a front side opposed to the power module board 23. A micro control unit (MCU) 25g and peripheral devices of the MCU 25g are disposed on a lower side on a rear side thereof.

As shown in FIG. 7, an arrangement position of the large components such as the capacitor 25e, the power relay 25f, and the like is a position where the large components consists of discrete components such as the capacitor 25e, the power relay 25f, and the like are above an upper edge of the control-unit mounting section 20 formed in the reduction gear box 4 when the control board 25 is attached to the synthetic resin frame 24. Distal ends of these large components are set to be in a state in which the distal ends project to above the worm housing unit 12 through a cutout section 23a formed in an upper part of the power module board 23. Projecting portions of these large components are covered with a partial cover 27.

In this way, the large components such as the capacitor 25e, the power relay 25f, and the like are arranged above the control board 25 and to be projected to the side above the worm housing unit 12. Consequently, it is possible to effectively use a free space on an upper side of the worm housing unit 12 in the reduction gear box 4, reduce the thickness from the power module board 23 to a rear end face of the protective cover 26 of the control unit 19, and reduce a size of the control unit 19.

The control unit 19 having the structure described above is assembled as described below. First, heat radiation grease is applied to a mounting position of the power module board 23 on the flat attaching surface 20a in the control-unit mounting section 20 of the reduction gear box 4 and, then, the power module board 23 is placed on the heat radiation grease and screwed to the flat attaching surface 20a. Subsequently, the synthetic resin frame 24 is placed on the flat attaching surface 20a and the frame attaching surface 20c to surround the power module board 23. The attachment plate section 24b of the synthetic resin frame 24 is screwed to the frame attaching surface 20c of the reduction gear box 4 in the same manner. After or before screwing the attachment plate section 24b, the control board 25 is screwed on a front side of the synthetic resin frame 24 after the external connection terminals 15c to 15f of the torque sensor 15 are inserted through the through holes 25a to 25d of the control board 25. Subsequently, the external connection terminals 15c to 15f and the through holes 25a to 25d are soldered and, then, finally, the protective cover 26 is attached to the flat attaching surface 20a and the partial cover 27 is attached to the protective cover 26 to cover the large components from the front surface side.

Thereafter, the steering column 3, the steering shaft 2, the worm 11, and the worm wheel 13 are assembled and, finally, the electric motor 5 is assembled and the bus bars 5c and 5d are screwed to the terminal block 24c of the control unit 19.

In this way, in a state in which the control unit 19 is mounted on the control-unit mounting section 20 of the reduction gear box 4, the thickness of the control unit 19 and a position of the flat attaching surface 20a of the control-unit mounting section 20 are set such that the control unit 19 is located further on the front side than a head of the bolt 18a for fixing the attachment flange 3c of the steering column 3 that serves as a stopper at the time of steering column contraction at the time of collapse in a rear end surface position of the cover 26 of the control unit 19 and a rearmost end position of the reduction gear box 4. The control unit 19 is mounted in a position where, at the time of collapse, the control unit 19 does not interfere with a moving member at the time of collapse.

Since it is unnecessary to provide a motor harness between the electric motor and the control unit, noise radiated from the motor harness is reduced and it is possible to reduce the influence on radio noise.

The power supply connector 24d and the signal connector 24e are disposed on a side of the control unit 19 opposite to the electric motor 5, i.e., on the right side of the vehicle. The electric motor 5, the control unit 19, the power supply connector 24d, and the signal connector 24e are linearly arranged. It is easy to connect the power supply connector 24d and the signal connector 24e to a battery side connector and a network side connector. The power supply connector 24d is in a position closer to the earth points normally provided in the left and right positions on the cabin side of the engine room. It is possible to reduce the length of earth cables between the power supply connector 24d and the earth points. Moreover, directions of connection of the power supply connector 24d and the signal connector 24e to the connectors forming pairs with the connectors 24d and 24e, respectively, are in the horizontal direction. It is possible to prevent penetration of drops of water and dust.

Next, operations in the embodiment are explained.

First, to assemble an electric power steering apparatus 1, the torque sensor 15 is fixedly arranged in the torque-sensor housing unit 16 of the reduction gear box 4 such that the distal ends of the external connection terminals 15c to 15f thereof extend to the rear of the vehicle body along the outer peripheral portion of the steering column 3.

Subsequently, the control unit 19 is mounted on the control-unit mounting section 20 of the reduction gear box 4. In this mounting of the control unit 19, first, heat radiation grease is applied to the flat attaching surface 20a and, then, the power module board 23 is placed on the heat radiation grease and screwed to the flat attaching surface 20a. In this state, the synthetic resin frame 24 is placed on the flat attaching surface 20a to surround the power module board 23 and the attachment plate section 24b of the synthetic resin frame 24 is brought into contact with the frame attaching surface 20c of the reduction gear box 4 and screwed. Moreover, the external connection terminals 15c to 15f of the torque sensor 15 are inserted through the through holes 25a to 25d of the control board 25, the through holes 25a to 25d and the external connection terminals 15c to 15f of the torque sensor 15 are soldered and, then, the cover 26 is attached to the control board 25 in the front, i.e., the vehicle body rear side of the synthetic resin frame 24, whereby the control unit 19 is configured.

Subsequently, the steering shaft 2, the steering column 3, the worm 11, the worm wheel 13, and the like are mounted on the reduction gear box 4 and, finally, the electric motor 5 is attached to the motor mounting section 17 of the reduction gear box 4 and the bus bars 5c and 5d of the electric motor 5 are screwed to the terminal block 24c of the control unit 19.

By configuring the control unit 19 as described above, the bus bars 5c and 5d of the electric motor 5 can be electrically connected directly to the terminal block 24c of the control unit 19 without the intervention of a motor harness. The external connection terminals 15c to 15f of the torque sensor 15 and the through holes 25a to 25d of the control board 25 can be electrically connected directly without the intervention of a signal cable. Therefore, the electric connection length between the control unit 19 and the electric motor 5 and torque sensor 15 can be minimized and a wiring resistance can be minimized. It is possible to control a power loss and reduce mixture of electric noise.

Moreover, the attachment plate section 24b is formed near the terminal block 24c connected to the bus bars 5c and 5d of the electric motor 5 formed in the synthetic resin frame 24 in the control unit 19. This attachment plate section 24b is fixed to the frame attaching surface 20c formed in the motor mounting section 17 of the reduction gear box 4. Therefore, the terminal block 24c can generate, with vibration of the vehicle, vibration different from that of the reduction gear box 4 to prevent stress concentration from occurring in the terminal block 24c and improve rigidity of the terminal block 24c.

The power module board 23 involving heat generation, which configures the control unit 19, is in direct contact with, via the heat radiation grease, the flat attaching surface 20a in the control-unit mounting section 20 of the reduction gear box 4 formed of any one of aluminum, an aluminum alloy, magnesium, and a magnesium alloy. Therefore, it is possible to directly radiate the generated heat of the power module board to the reduction gear box 4 serving as the heat mass with a large heat capacity via the heat radiation grease and surely prevent the power module board 23 from coming into an overheated state. In this way, it is possible to further improve the effect of heat radiation to the reduction gear box 4 by applying the heat radiation grease between the power module board 23 and the flat attaching surface 20a.

Moreover, the power module configured by the field effect transistor and the like involving heat generation is mounted on the power module board 23 and the control element such as the micro control unit 25g and the like that rejects heat is mounted on the control board 25. Therefore, the generated heat of the power module board 23 is not directly transmitted to the control board 25. It is possible to surely prevent the generated heat of the power module board 23 from affecting the control board 25. Moreover, the heat generating members such as the capacitor 25e and the like mounted on the control board 25 are arranged in the upper part. Therefore, it is possible to surely prevent the heat generated by the heat generating members from affecting the control elements disposed in the lower part and on the opposite side of the heat generating members. Furthermore, the large components such as the relay, the capacitor and the like are housed in the free space on the upper side. Therefore, it is possible to effectively use the free space to reduce a size of the control unit itself.

Moreover, the protective cover 26 has conductivity and directly screwed to the control-unit mounting section 20 of the reduction gear box 4. Therefore, it is possible to show the electromagnetic shield effect and prevent electromagnetic noise, which occurs at the time of high-frequency switching of the field effect transistor of the H bridge circuit, from leaking to the outside to change to radio noise.

Moreover, it is possible to reduce the length in the axial direction of the entire reduction gear box 4 and realize a reduction in size thereof by arranging the control unit 19 above the torque-sensor housing unit 16 of the reduction gear box 4.

The upper attachment bracket 6 and the lower attachment bracket 7 are attached to the vehicle body side member and, then, the external connection connectors connected to the battery and the earth points and the connection connector of the network such as the CAN are attached to the power supply connector 24d and the signal connector 24e of the control unit 19, respectively, from the vehicle body right side, whereby the assembly of the electric power steering apparatus 1 is completed.

In this way, the connection of the external connection connectors to the power supply connector 24d and the signal connector 24e can be performed from the right side on the vehicle body outer side. Therefore, it is possible to easily perform connection of both the connectors. Moreover, the power supply connector 24d is in a position close to the earth points normally provided in the left and right positions on the cabin side of the engine room of the vehicle. It is possible to reduce the length of the earth cables between the power supply connector 24d and the earth points. Moreover, directions of connection of the power supply connector 24d and the signal connector 24e to the connectors forming pairs with the connectors 24d and 24e, respectively, are in the horizontal direction. It is possible to prevent penetration of drops of water and dust.

Incidentally, when the power supply connector 24d and the signal connector 24e are provided above the control unit 19, there is inconvenience that a space between the connectors and the vehicle side members is narrow and workability of connector connection is low and drops of water and dust tend to penetrate. However, it is possible to eliminate the inconvenience by providing the power supply connector 24d and the signal connector 24e in the vehicle outer side direction.

The power supply connector 24d and the signal connector 24e are formed on the side of the synthetic resin frame 24 opposite to the electric motor 5. Therefore, the power supply connector 24d and the signal connector 24e are not affected by the heat of the heat-generating electric motor 5 at all. Thermal conductivity of the synthetic resin frame 24 is low. Therefore, it is possible to more surely block the influence of the generated heat of the electric motor 5.

In this normal state, in the upper attachment bracket 6, as shown in FIG. 1, the sliding plate section 6f is fixed to the capsule 6d configuring the attachment plate section 6a by the resin injection 6e.

When this assembly of the electric power steering apparatus 1 is completed, it is possible to release a tilt lock state by pivoting the tilt lever 6g of the upper attachment bracket 6 and adjust a tilt position by pivoting the steering column 3 in this state around the pivot 7c of the lower attachment bracket 7.

When a not-shown ignition switch of the vehicle is turned on to supply electric power to the power module board 23 and the control board 25 from the battery, steering assistance control processing is executed by the micro control unit (MCU) and a steering assisting current command value is calculated on the basis of detection values of the torque sensor 15 and the not-shown speed sensor. Current feedback processing is executed on the basis of this steering assisting current command value and a motor current detected by a motor-current detecting unit to calculate a voltage command value. This voltage command value is supplied to a gate driving circuit of the power module board 23 to control the H bridge circuit, whereby a motor driving current flows to the electric motor 5 to drive the electric motor 5 to generate a necessary steering assisting force in a normal or reverse rotating direction.

Therefore, a steering assisting force corresponding to steering torque of the steering wheel is generated from the electric motor 5 and this steering assisting force is transmitted to an output of the steering shaft via the worm 11 and the worm wheel 13. Consequently, it is possible to steer the steering wheel with a light steering force.

Figure 12:
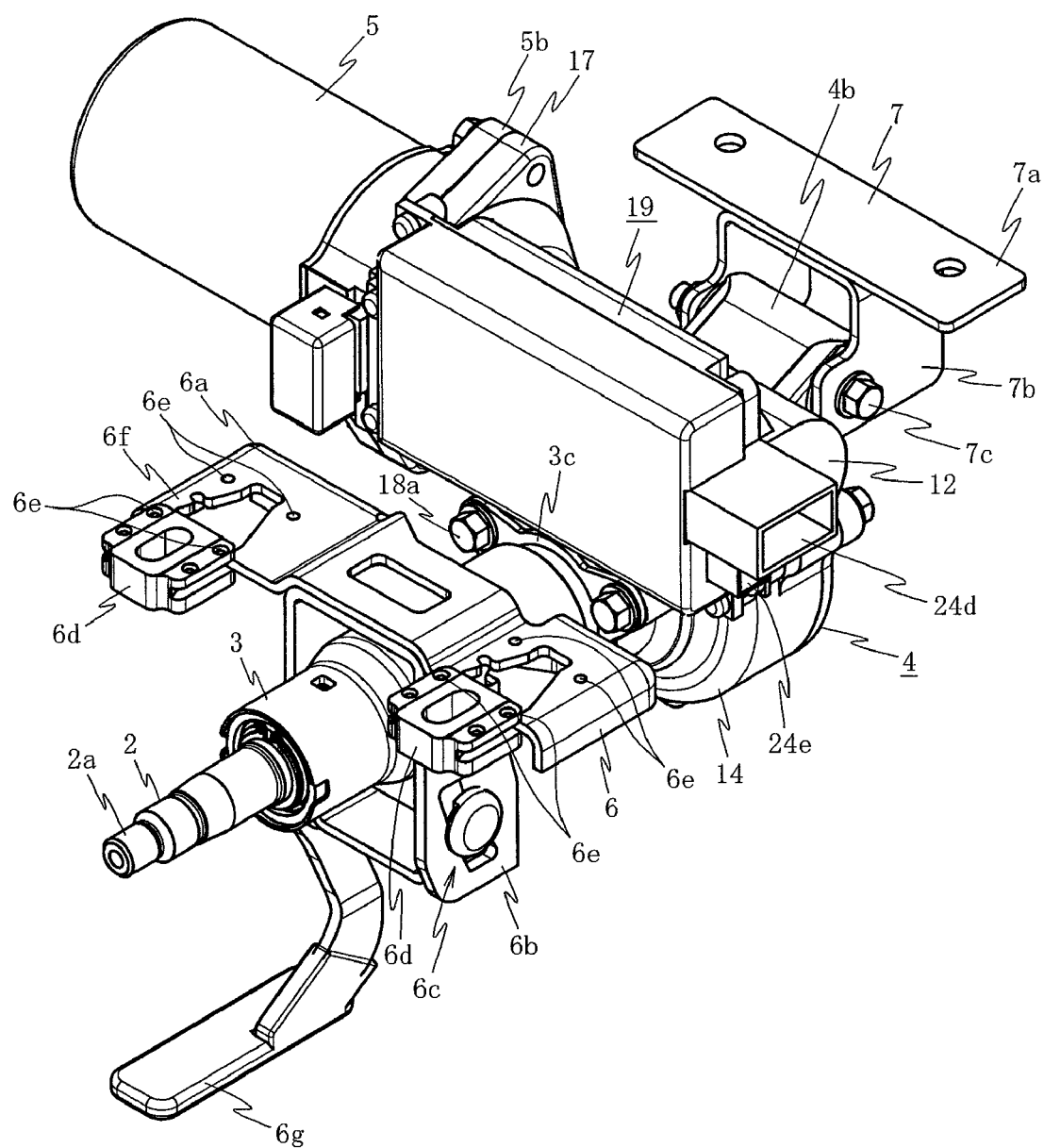
FIG. 12 is a perspective view showing the electric power steering apparatus at the time of collapse.
Figure 13:
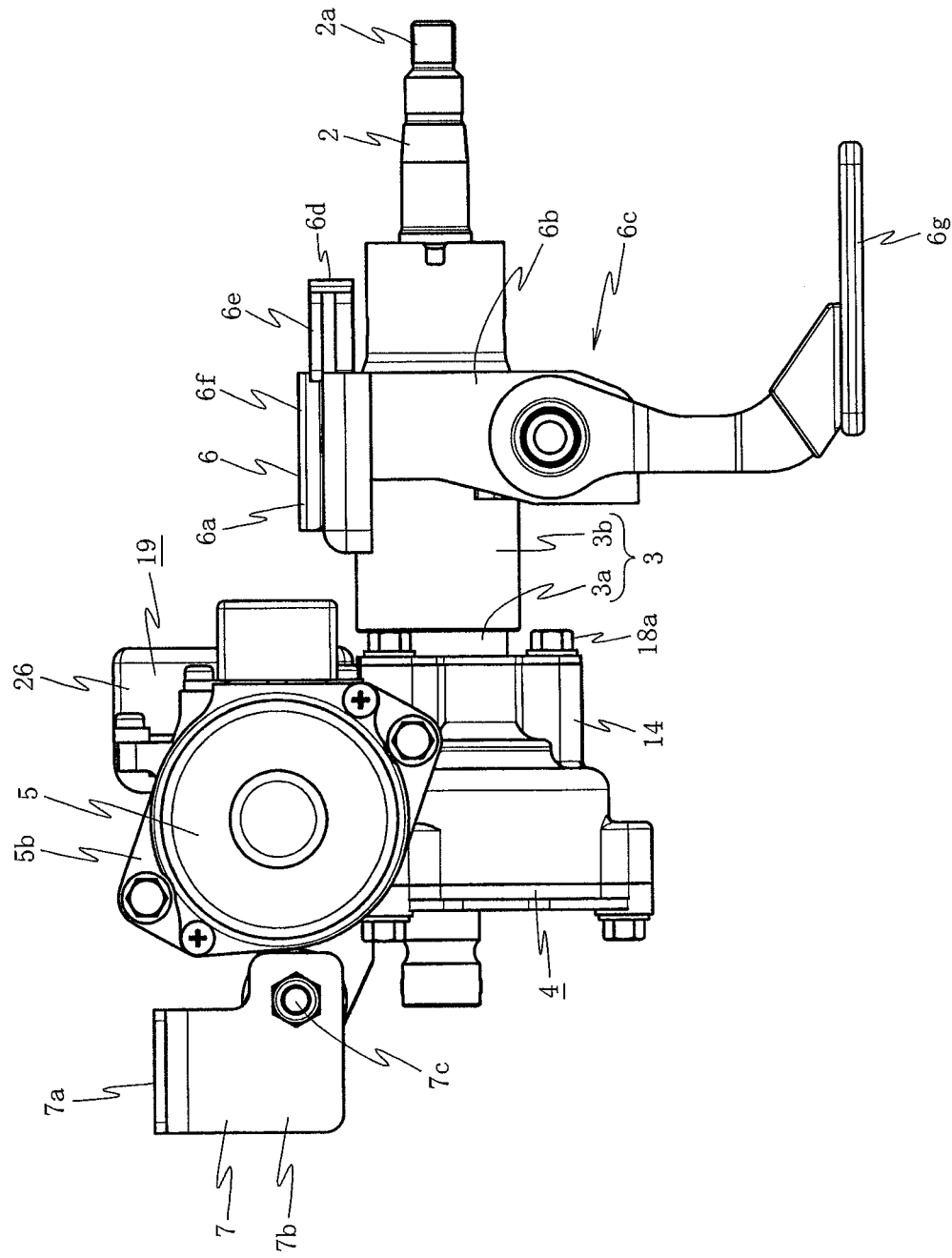
FIG. 13 is a left side view of the electric power steering apparatus at the time of collapse.
Figure 14:
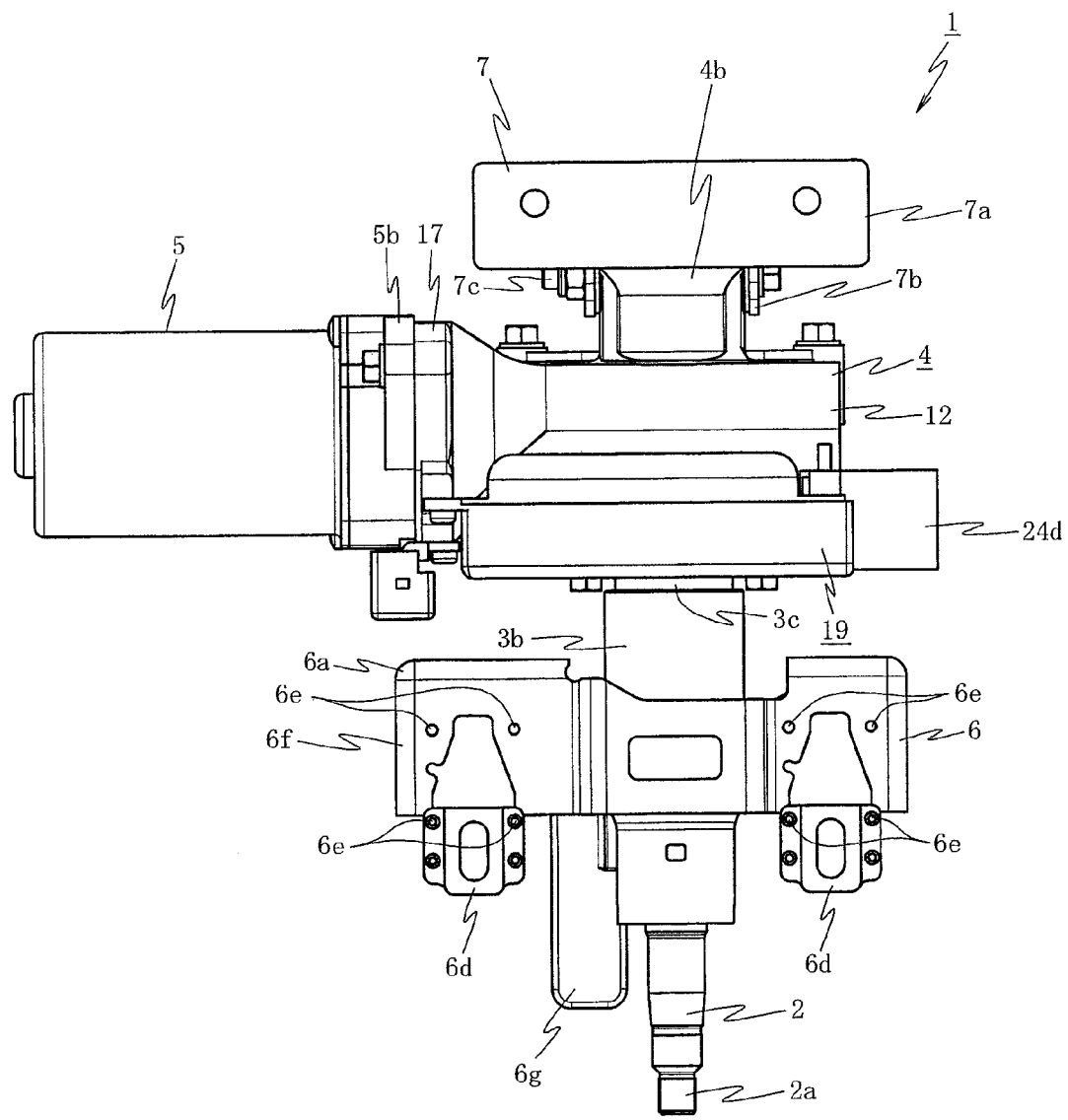
FIG. 14 is a plan view of the electric power steering apparatus at the time of collapse.

In this state, when a driver touches the not-shown steering wheel at the time of occurrence of collapse and an impact force that slides the steering column 3 forward acts on the steering column 3, as shown in FIGS. 12 to 14, the resin injection 6e between the capsule 6d and the sliding plate section 6f of the upper attachment bracket 6 is sheared. Consequently, the outer tube 3b slides with respect to the inner tube 3a on the attachment flange 3c side of the steering column 3 while absorbing the impact force and comes into contact with the head of the bolt 18a serving as the contraction stopper, whereby the steering column 3 contracts while securing a necessary collapse stroke.

When the steering column 3 contracts in this way, the members attached around the steering column 3 approach to the control unit 19. However, this control unit 19 is arranged in a position where the control unit 19 does not interfere with moving components in a state in which a predetermined collapse stroke is secured. Therefore, the control unit 19 does not interfere with the moving components to prevent collapse. It is possible to secure the necessary collapse stroke.

Incidentally, although it is conceivable to crush the control unit 19 as well in order to secure a collapse stroke at the time of occurrence of collapse, as described above, this control unit 19 has a problem in that it is difficult to control the crush of the synthetic resin frame 24 and variation occurs in an energy absorption amount at the time of collapse. However, in this embodiment, since the crush of the control unit 19 is not taken into account to secure a collapse stroke, it is possible to secure a stable energy absorption amount as specified by a set value at the time of collapse.

In the embodiment, the case in which the power module board 23 is made of the metal board having high thermal conductivity is explained. However, with a metal board as a high heat conduction plate section separately provided, the power module board 23 may be attached to the flat attaching surface 20a of the control-unit mounting section 20 via the metal board and heat radiation grease. Moreover, the power module board 23 made of the metal board may be mounted on the flat attaching surface 20a via another metal board and heat radiation grease.

In the embodiment, the case in which the power supply connector 24d and the signal connector 24e are provided on the vehicle outer side of the synthetic resin frame 24 to be connected from the vehicle outer side is explained. However, the present invention is not limited to this. A connecting direction of the external connectors can be set in an arbitrary direction such as a front to rear direction along the axial direction of the steering column 3 or a direction crossing the front to rear direction. The power supply connector 24d and the signal connector 24e can be laid out according to a desired connecting direction.

Moreover, in the embodiment, the case in which the bus bars 5c and 5d of the electric motor 5 linearly extend is explained. However, the present invention is not limited to this. As shown in FIG. 15A, the bus bars 5c and 5d may be once projected outward and, then, bent in the axial direction of the electric motor 5 and extended outward in a direction orthogonal to the axial direction. In this case, elasticity in bending portions of the bus bars 5c and 5d can be secured. Therefore, it is possible to ease a residual stress that occurs at the time of connection of the terminals and the terminal block and extend the durable life of the bus bars 5c and 5d. Similarly, as shown in FIG. 15B, the bus bars 5c and 5d may be projected in the axial direction of the electric motor 5 first and, then, extended outward in the direction orthogonal to the axial direction.

Furthermore, in the embodiment, the case in which the bus bars 5c and 5d are provided in the electric motor 5 and the terminal block 24c is provided in the control unit 19 is explained. However, the present invention is not limited to this. A terminal block may be provided in the electric motor 5 and bus bars may be provided in the control unit 19. The external connection terminals are not limited to bus bars. Arbitrary electric connection terminals can be applied.

Furthermore, in the embodiment, the case in which the external connection terminals 15c to 15f of the torque sensor 15 are bent in an L shape and inserted through the through holes 25a to 25d of the control board 25 is explained. However, the present invention is not limited to this. In order to facilitate the insertion of the external connection terminals 15c to 15f through the through holes 25a to 25d, a guide member having a funnel-like guide surface may be provided on a side for inserting the external connection terminals 15c to 15f of the through holes 25a to 25d.

In the embodiment, the case in which the external connection terminals 15c to 15f of the torque sensor 15 are formed in an L shape is explained. However, the present invention is not limited to this. The external connection terminals 15c to 15f may be formed in a linear shape and electrically connected by soldering, fusing, or the like along a connection land formed on the control board 25. The external connection terminals may be formed as clip terminals and clip the control board 25.

Moreover, in the embodiment, the case in which the flat attaching surface 20a of the control-unit mounting section 20 of the reduction gear box 4 is the plane orthogonal to the center axis of the steering column 3 is explained. However, the present invention is not limited to this. The flat attaching surface 20a may be a surface inclined with respect to a surface orthogonal to the center axis of the steering column 3.

Moreover, in the embodiment, the case in which the electric motor 5, the control unit 19, and the connectors 24d and 24e are linearly arranged along the line orthogonal to the center axis of the steering column 3 is explained. However, the present invention is not limited to this. The electric motor 5, the control unit 19, and the connectors 24d and 24e may be linearly arranged along a line crossing the center axis of the steering column 3.

Furthermore, in the embodiment, the case in which the power supply connector 24d and the signal connector 24e of the control unit 19 have the connection openings thereof on the right end side is explained. However, the present invention is not limited to this. With the connection openings set in a direction along the axial direction of the steering column 3, the external connectors may be attached from the axial direction of the steering column 3.

Furthermore, in the embodiment, the case in which, when the control unit 19 is assembled, first, the power module board 23 is screwed to the flat attaching surface 20a and, then, the synthetic resin frame 24 is fixed, and the control board 25 is screwed to this synthetic resin frame 24 is explained. However, the present invention is not limited to this. The synthetic resin frame 24 may be fixed to the flat attaching surface 20a after the power module board 23 and the control board 25 are attached to the synthetic resin frame 24. Moreover, a part of the synthetic resin frame 24 and the power module board 23 may be fastened together.

In the embodiment, the case in which the power module board 23 is made of the metal board having high thermal conductivity is explained. However, with a metal board separately provided, the power module board 23 may be attached to the flat attaching surface 20a of the control-unit mounting section 20 via the metal board and heat radiation grease. Moreover, the power module board 23 made of the metal board may be mounted on the flat attaching surface 20a via another metal board and heat radiation grease.

Moreover, in the embodiment, the case in which, when the control unit 19 is assembled, first, the power module board 23 is screwed to the flat attaching surface 20a and, then, the synthetic resin frame 24 is fixed, and the control board 25 is screwed to this synthetic resin frame 24 is explained. However, the present invention is not limited to this. The synthetic resin frame 24 may be fixed to the flat attaching surface 20a after the power module board 23 and the control board 25 are attached to the synthetic resin frame 24. Moreover, a part of the synthetic resin frame 24 and the power module board 23 may be fastened together.

Furthermore, in the embodiment, the case in which the brush motor is applied as the electric motor 5 is explained. However, the present invention is not limited to this. A brushless motor may be applied. In this case, it is sufficient to connect the bus bars 5c and 5d to power supply side of energization coils of respective phases and mount, on the power module board 23, an inverter circuit having, for example, a field effect transistor (FET) for driving the brushless motor and a gate driving circuit that drives a gate of the field effect transistor of the inverter circuit with a pulse width modulation signal.

Furthermore, in the embodiment, the case in which the present invention is applied to the right-hand drive car is explained. However, the present invention is not limited to this. When the present invention is applied to a left-hand drive car, as the arrangement of the reduction gear box 4, the electric motor 5, and the control unit 19, it is sufficient to arrange the electric motor 5 surface-symmetrically to the control unit 19 across a vertical surface passing the center axis of the steering column 1, i.e., on the right side of the control unit 19 and arrange the power supply connector 24d and the signal connector 24e of the control unit 19 on the left side. Moreover, the electric motor 5 may be arranged on the vehicle outer side and the power supply connector 24d and the signal connector 24e may be arranged on the vehicle inner side.

In the embodiment, the case in which the electric motor 5 is arranged on the vehicle inner side of the control unit 19 and the connectors 24d and 24e are provided on the vehicle outer side of the control unit 19 is explained. However, the present invention is not limited to this. Depending on a layout of the vehicle, the electric motor 5 may be provided on the vehicle outer side with respect to the control unit 19 and the connectors 24d and 24e may be provided on the vehicle inner side. In short, the connectors 24d and 24e only have to be provided on a side of the control unit 19 opposite to the electric motor 5.

INDUSTRIAL APPLICABILITY

At least a control unit including a power module board involving heat generation is directly attached to a reduction gear box with large heat mass. Consequently, it is possible to provide an electric power steering apparatus that can improve a heat radiation effect.

An electric motor is attached to one of a vehicle inner side and a vehicle outer side of the control unit and external connection connectors are provided on the other of the vehicle inner side and the vehicle outer side of the control unit. Consequently, it is possible to provide an electric power steering apparatus in which penetration of drops of water and dust and can be prevented, a degree of freedom in a connecting direction of the external connection connectors can be increased, and, moreover, connector connection is easy and the connector side is not affected by generated heat of the electric motor.

Moreover, the control unit is arranged in a position where the control unit does not interfere with moving members at the time of a collapse stroke of a steering column of the reduction gear box. Consequently, it is possible to provide an electric power steering apparatus in which a predetermined collapse stroke of the steering column can be secured and a stable energy absorption amount as specified by a set value can be obtained at the time of collapse.

The invention claimed is:

1. An electric power steering apparatus comprising:
 a steering column having inserted therein a steering shaft to which steering torque is transmitted;
 a reduction gear box coupled to the steering column; and
 an electric motor that transmits a steering assisting force to the steering shaft via a reduction mechanism in the reduction gear box, wherein:
 in the reduction gear box, the electric motor is mounted on a motor mounting section formed at an end face in a direction crossing the steering shaft and a control unit for controlling to drive the electric motor is mounted on a control-unit mounting section formed on an outer surface close to the motor mounting section, and
 the control unit includes at least a control board mounted with a command-value calculating unit that calculates a driving command value of the electric motor and a power module board mounted with a power module involving heat generation that controls to drive the electric motor on the basis of the driving command value from the command-value calculating unit, and the power module board is directly mounted on the control-unit mounting section of the reduction gear box.

2. The electric power steering apparatus according to claim 1, wherein the power module board is mounted on the control-unit mounting section of the reduction gear box via a high heat conduction plate section.

3. The electric power steering apparatus according to claim 1, wherein the reduction gear box is made of a high heat conductive material.

4. The electric power steering apparatus according to claim 3, wherein the reduction gear box is formed by die-casting any one of aluminum, an aluminum alloy, magnesium, and a magnesium alloy.

5. The electric power steering apparatus according to claim 1, wherein the control unit includes a synthetic resin frame that surrounds the power module board directly mounted on the reduction gear box and holds the control board while keeping a predetermined space with respect to the power module board and a cover that covers the synthetic resin frame, and the cover is attached to the control-unit mounting section of the reduction gear box.

6. The electric power steering apparatus according to claim 1, wherein, in the control board, discrete components are arranged on an upper side to effectively use an upper side free space of the control-unit mounting section in the reduction gear box.

7. The electric power steering apparatus according to claim 1, wherein the reduction gear box includes at least a worm housing unit that houses a worm coupled to an output shaft of the electric motor, a worm-wheel housing unit that houses a worm wheel coupled to the steering shaft, and a torque-sensor housing unit that is coupled to the worm-wheel housing unit to house the torque sensor and coupled to the steering column, and the control-unit mounting section for mounting the control unit is formed in an outer peripheral portion of the worm housing unit, the worm-wheel housing unit, and the torque-sensor housing unit.

8. The electric power steering apparatus according to claim 1, wherein the electric motor is disposed on one of a vehicle inner side and a vehicle outer side of the control unit and a connection connector for connection to an external connection connector is disposed on the other of the vehicle inner side and the vehicle outer side of the control unit.

9. The electric power steering apparatus according to claim 8, wherein a direction of connection of the connection connector to the external connection connector is set in a vehicle width direction.

10. The electric power steering apparatus according to claim 8, wherein the connection connector includes a power supply connector and a signal connector adjacent to each other.

11. The electric power steering apparatus according to claim 8, wherein the electric motor is disposed on the vehicle inner side of the control unit and the connection connector is disposed on the vehicle outer side of the control unit.

12. The electric power steering apparatus according to claim 8, wherein the electric motor and the control unit are electrically connected directly by a connection terminal and a terminal block.

13. The electric power steering apparatus according to claim 1, wherein the control unit is disposed in a position where the control unit does not interfere with a moving member at the time of a collapse stroke of the steering column of the reduction gear box.

14. The electric power steering apparatus according to claim 13, wherein the reduction gear box includes at least a worm housing unit that houses a worm coupled to an output axis of the electric motor, a worm-wheel housing unit that houses a worm wheel coupled to the steering shaft, and a torque-sensor housing unit that is coupled to the worm-wheel housing unit to store the torque sensor and coupled to the steering column, and the control-unit mounting section for mounting the control unit is formed in an outer peripheral portion of the worm housing unit, the worm-wheel housing unit, and the torque-sensor housing unit, a distal end of the torque-sensor housing unit is formed as a contraction stopper for the steering column at the time of collapse, and a contraction stopper side end surface position of the control unit mounted on the control-unit mounting section is set further on a worm-wheel housing unit side than the contraction stopper.

* * * * *